3,605,294
SHAPED ARTICLES

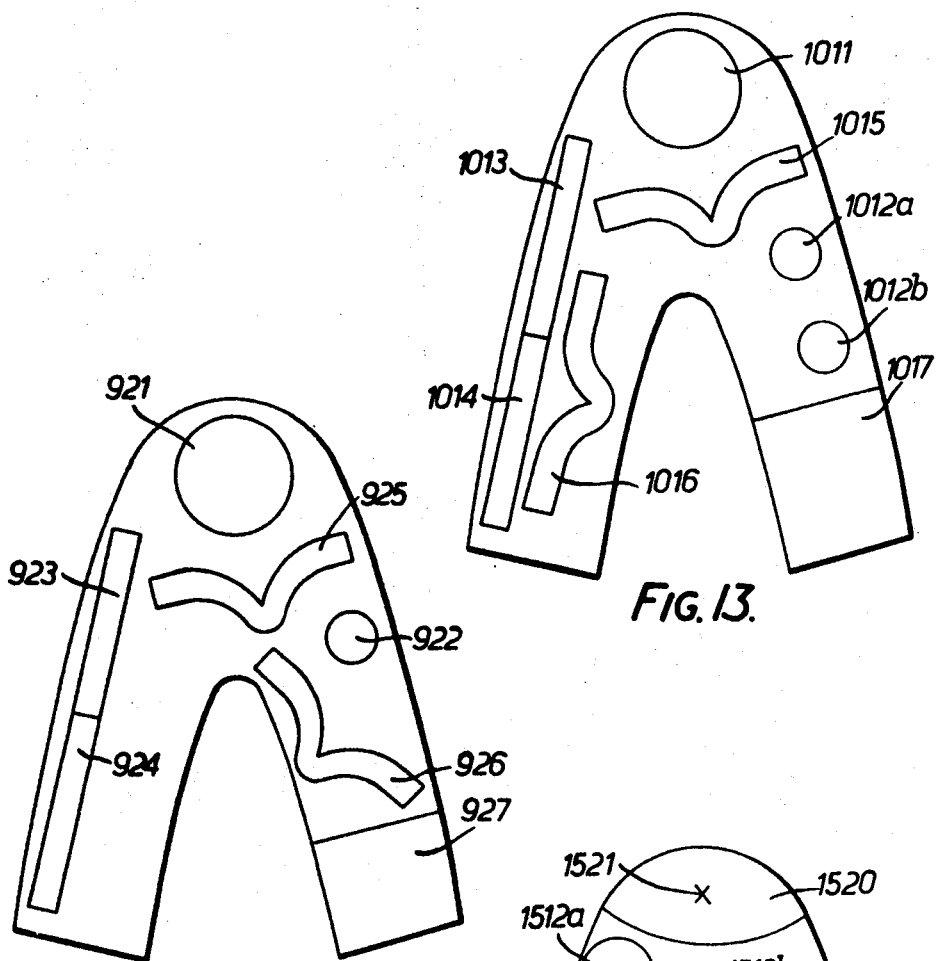
FIG. 9.   FIG. 13.   FIG. 17.
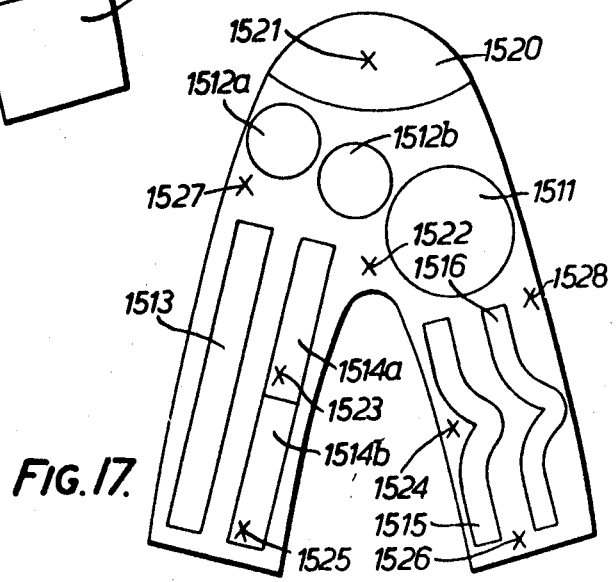

Victor Ralph Cunningham, Hutton, and Graham Rodney Hull, Dagenham Dock, England, assignors to Porvair Limited, Dagenham Dock, Essex, England
Filed May 1, 1969, Ser. No. 820,850
Claims priority, application Great Britain, May 1, 1968, 20,737/68
Int. Cl. A43b *00/00, 21/00*
U.S. Cl. 36—45                                           7 Claims

ABSTRACT OF THE DISCLOSURE

A three dimensionally conformed article comprising sheet polymer material which is water vapour permeable, self-supporting, flexible and substantially resistant to loss of shape.

---

The present invention relates to three dimensionally conformed articles made of polymeric materials having walls about 0.5 to 5 mm. thick which are flexibly resistant to ingress of liquid water but permeable to water vapour and have improved shape retention. It is particularly applicable to shoe uppers and shoes, in connection with which it will be described. The invention also extends to methods of making the improved articles.

The invention is particularly concerned with producing three dimensionally conformed or hollow articles having a leather-like appearance and properties and with providing a process by which such articles can be simply and economically made in a single piece rather than having to be made from one or more pieces by means of joints.

The invention provides hollow or three dimensionally conformed man-made leather-like articles having a leather-like appearance and in the preferred embodiment also a high degree of vapour permeability whilst still providing adequate resistance to liquid water penetration. The term "man-made leather-like" as used herein means a material having a handle appearance and breathability resembling that of natural leather to such an extent as to make it suitable for use as a replacement for leather. The term "natural leather" is to be taken to include all sheet materials derived from animal or reptile skins and includes grain leather, suede leather and split suede leather.

Conventional shoe making processes involve stretching and compressing a sheet material to a three dimensionally conformed shape together with what can be thought of as a simultaneous bending of the conformed shape.

Thus the conventional process of lasting involves pulling a flat sheet of material over and around a last and then either causing the material to set to the lasted shape either by leaving it stretched over the last for a period as long as several weeks or by heating and steaming the material on the last. However the lasting process can involve certain areas of the lasted material for example the toe being stretched by as much as 25% and thus the stresses which have to be set into the material are considerable.

Lasted shoes with these built in stresses are liable to lose their shape as the material has a tendency to return to its original undistorted flat shape.

An object of the present invention is to provide an improved shoe upper component, especially an integral vamp and toe component, or integral shoe upper which is resistant to fall in and indeed which when distorted by applied forces tends to return to its original three dimensionally conformed shape rather than to a flat shape.

A further object is to provide an improved upper and integral partial or complete insole component so as to implify shoe making operations.

A further object is to provide a three dimensionally conformed article for example a shoe upper reinforced with a fabric but free from surface irregularities or "orange peel," the surface appearance which is on occasion observed when a sheet man-made leather-like material incorporating a fabric reinforcement for example a woven fabric or a needle punched non-woven felt is lasted.

A further object is to enable shoes to be made with a simpler construction because the reduced tendency to fall in enables fabric reinforcing linings and doublers often used in conventional shoe construction to be made of lighter material or even dispensed with.

According to the present invention there is provided a three dimensionally conformed article comprising sheet polymer material, typically 0.5 to 5 mm. thick, which is water vapour permeable, preferably resistant to ingress of liquid water, self-supporting flexible and substantially resistant to loss of shape.

When the invention is applied to shoe uppers or shoe upper components the article which is a three dimensionally conformed sheet preferably has a thickness in the range 0.8 to 1.5 mm. preferably 0.8 to 1.1 mm. for women's weight shoes and 1.1 to 2.5 mm. preferably 1.5 to 1.8 mm. for men's weight shoes.

The material preferably has a water vapour permeability when measured as in Example 1 by the main test of at least 10 preferably at least 20 especially at least 40 and particularly in the range 50 to 80. The material preferably in also resistant to ingress of liquid water to the extent that when in a static condition it does not absorb a drop of moisture placed on its surface. Preferably when flexed as in the Satra cold flex test described in Example 1 but at 25° C. the drop of water is not absorbed until after at least 10 preferably 50 and especially 100 to 200 cycles.

The material is preferably substantially resistant to loss of shape at least to the extent that when heated to a temperature significantly in excess of normal use temperature e.g. 25° C. but substantially below the collapse temperature of the material (that temperature at which it loses its vapour permeable porous structure and collapses to a solid translucent or transparent sheet), for example 160° F. to 300° F. especially 200 to 240° F. for an elastomeric polyurethane of the type described in Example 1 or Example 9, it does not change in shape from its original three dimensionally conformed shape to any substantial extent when the heating is carried out for ¼ hour, or when distorted by the application of pressure from its original undistorted shape tends on similar heating to substantially regain its original undistorted shape. Materials which have been produced by distorting an originally flat sheet are observed on this cycle of treatment to change their three dimensionally conformed shape to a substantial extent and not to regain it on further heating or on heating having been distorted to a flat shape by the application of pressure.

In Examples 2 and 3 below the toe cap was cut out from a shoe upper in accordance with this invention and from one which had been lasted from a flat sheet of fleeceless man-made leather-like material. The toe caps were cut immediately above the welt so that the "turn-in" or partial insole portion of the upper was not included in the cut out portion and thus did not have any effect on the way in which the toe caps behaved on heating. In Examples 9, 11 and 16 the "turn-in" or partial insole was included in the cut out toe portion and influenced the way in which the shape changed in the test causing the lasted materials to curl up rather than flatten out on heating. It will be observed that the partial insole portions tended to try and straighten towards a flat shape with the rest of the toe in the lasted toe caps of Examples 11 and 16 whilst in the toe cap of Example 9 the partial insole portion returned to a more horizontal position which corresponded with its position in the original upper and from which it had been distorted while being cut from the upper.

The invention encompasses not only integral shoe uppers with complete and partial insole portions but also components for shoe uppers such as a vamp or quarter area and the upper components may be in flattened out form as disclosed in British patent specifications Nos. 1,096,001 and 1,096,002, the disclosures of which are incorporated herein by reference, which disclose the concept of separating the bending or wrapping movement of a conventional lasting operation from the stretching and compressing movements, in which a rather flattened shoe upper shape is formed first by stretching the material out of a sheet and the sides are then in a subsequent operation wrapped round the last. The present invention is of advantage in connection with preshaped components of this sort because it is the parts of the upper which have been stretched which are most likely to fall in and lose their shape. Since the components in accordance with the present invention do not lose their shape the moulds or formers on which they are made do not need to allow for this and accordingly can be shaped in accordance with the human foot. The upper can also be divided into other parts rather than merely across the instep or down the heel, for example the upper could be made in two or more parts divided about a line running up the heel and down the middle of the vamp to the toe, particularly in the case when bootees or boots are being made.

These upper components can be joined to other upper components by conventional techniques such as skiving nd stitching or adhesives or welding; particularly with the fleeceless embodiment of the invention the skiving can be achieved by compression as by heat and pressure.

In accordance with one form of the present invention an article in accordance with the present invention in the form of a shoe upper component (which may be an integral shoe upper or only part of a shoe upper) is provided with at least a partial integral insole portion and preferably a complete integral insole.

The material in one form of the invention is a fleeceless material which does not have a fibrous reinforcement and throughout its thickness consists essentially of elastomeric microporous polymer.

Unlike the conventional fabric reinforced upper leather substitutes which have ultimate elongations of some 20–60%, it can be stretched over 150%, for example, some 250, 300 or even 500 or 700%.

Even when a shoe upper component in accordance with the present invention incorporates an integral fabric reinforcement, which may be elastic in one or both directions, so that the material only has an ultimate elongation similar to that of conventional leather substitutes prior to lasting the fact that it is not already extended in its conformed shoe upper shape means that in use it is appreciably more stretchy in feel than lasted fabric reinforced leather substitutes. The fabric may be knitted woven or non-woven and may be in the form of a sock.

Shoes made with natural leather uppers often become comfortable only after a "break-in" period during which the leather becomes permanently distorted from its as-lasted shape to a shape conforming to the foot of the wearer. Conventional substitutes for upper leathers do not have this property to a significant degree; with shoes made of such materials it is customary for the shoe salesman to "overfit"; that is, he suggests the purchase of a size in which the wearer's foot has more room. The fleeceless material of this invention also does not become significantly permanently distorted during wear. It returns to substantially its original three dimensionally conformed shape overnight. However, shoes made in accordance with this aspect of the invention have been found to be immediately comfortable on the foot without overfitting; it appears that because of its stretchiness the material readily accommodates itself to the particular shape of the wearer's foot without exerting such pressures as would make the shoes uncomfortable even for people with bunions.

Preferably the polymer sheet material of the articles in accordance with the invention, which are fleeceless, is such that when stripped from any adhered layers and tested in an unsupported state, it has in the plane of the layer when loaded under tension to produce a constant rate of extension of four inches per minute using a sample 6 inches long and 0.5 inch wide, a tensile strength of at least 10, preferably 20 lbs. per inch width per mm. thickness, being the load at which the sample ruptures, an initial modulus of at least 2 preferably 4 lbs. per inch width per mm. thickness, being the load required to produce a 5% elongation, and a notch tear strength of at least 2, preferably 5, lbs. per mm. thickness, being the load at which the sample ruptures in this test; using the tests given in Example 1 the values are: ultimate tensile strength at least 5, preferably 8 to 16; initial modulus at least 2, preferably 4 to 6; notch tear strength at least 2, preferably 4 to 12.

The polymer can be any organic resin material which is capable of forming a film on coagulation from an emulsion, a colloidal dispersion, a gel or a solution whether the film is water vapour permeable or not.

The polymer must also be capable of undergoing the various processes specified in the methods described below. However, when the product is intended for use as a man-made, leather-like material and elastomeric polymer is preferably used. The particular strength and wear characteristics required for the end use of the man-made, leather-like material will determine the particular polymer to be used.

For shoe uppers high abrasion resistance and tear strength combined with a reasonable extensibility and initial modulus to provide proper wear comfort on the foot are required.

Many thermoplastic polymers can be used, for example polyvinylchloride and its copolymers, acrylonitrile polymers and copolymers and polyurethanes or blends of one or more of these.

As is known elastomeric polyurethanes and blends of these materials with minor proportions say up to 49%, preferably less than 20%, of polyvinyl chloride and other polymers and copolymers such as nitrile rubbers including solid copolymers of butadiene and acrylonitrile, are excellent for use in the production of shoe upper materials.

Other polymers which have been suggested for use in man-made, leather-like materials include polyacetal resins, vinyl halide polymers (including copolymers with other ethylenically unsaturated monomers), polyamides, polyesteramides, polyesters, polyvinyl butyral, polyalphamethylstyrene, polyvinylidene chloride, polymers of alkyl esters of acrylic and methacrylic acids, chlorosulphonated polyethylene, copolymers of butadiene and acrylonitrile, cellulose esters and ethers, polystyrene and other polymers made from monomers containing vinyl groups.

The preferred polymers, however, are elastomeric polyurethanes having recovery properties intermediate between pure rubbers and pure thermoplastic materials at room temperature.

The article by Schollenberger Scott and Moore in "Rubber Chemistry and Technology," vol. XXXV, No. 3, 1962, pages 742 to 752 at page 743 and in FIG. 3 indicates the long so-called half lives of the polyester urethanes made from adipic acid, 1,4 butane diol and diphenyl methane-p,p'-diisocyanate by the methods disclosed in U.S. Pat. No. 2,871,218 and sold under the trademark Estane 5740. These two disclosures are incorporated herein by reference.

Polyurethanes may be based on a wide variety of precursors which may be reacted with a wide variety of polyols and polyamines and polyisocyanates. As is well known the particular properties of the resulting polyurethanes to a large extent can be tailored by suitable choice of the reactants, reaction sequence and reaction conditions.

The preferred polymers are elastomeric polyurethanes based on a linear, hydroxyl terminated polyester (although a polyether or a polyether/polyester blend may be used) and a diisocyanate, with a small addition of a difunctional low molecular weight reactant. The last mentioned component may be added either with the other reactants at the start of a one-step polymerization or at a later stage when it will act primarily as a chain extender.

This type of polyurethane having thermoplastic properties is particularly preferred for use in producing shoe uppers. Particularly prefered polyurethanes are those derived from polyesters by reaction with diols and diisocyanates. As is known from U.S. Pat. No. 2,871,218, mentioned above, many different polyesters, diols and diisocyanates can be used, but a particularly suitable polyurethane system is one in which a polyester made from ethylene glycol and adipic acid is reacted with 1,4-butylene glycol and with 4,4' - diphenylmethane diisocyanate.

In the system in accordance with the above patent the mole ratios of polyester and diol can vary between quite wide limits but the combined mole ratio of polyester and diol is arranged to be essentially equivalent to the mole ratio of diisocyanate so that the resultant polymer is essentially free of unreacted hydroxyl or isocyanate groups.

Polymers of this type but having an improved Shore hardness can be made by using a slight excess of diisocyanate and also by using a copolyester as by replacing part of the ethylene glycol in the above system by 1,4-butylene glycol.

A further alternative polyurethane system which has been found particularly suitable uses polyesters derived from caprolactones. Such polyurethanes are described in British patent specification No. 859,640, the disclosure of which is incorporated herein by reference.

The polymers may be produced by a bulk polymerization process and subsequently dissolved in suitable solvents or may be prepared directly in solution by a solution polymerization process.

The polymer can include conventional stabilizers fillers, processing aids, pigments, dyes, additives, and surface active agents for example proofing or wetting agents.

The invention also extends to footwear such as shoes and boots incorporating the new and improved upper components or integral uppers of the invention.

In a preferred form of the invention a method of making an article in accordance with the invention for example a shoe upper or a slipper, comprises:

(a) forming a mixture comprising polymer extended with a liquid vehicle, (b) shaping the mixture into a three dimensionally conformed shape, for example by coating a three dimensional former, for example a foot shape or a last, with the mixture, and (c) coagulating the polymer into self-supporting flexible form with non solvent for the polymer.

Preferably the forming is achieved in such a way that non solvent can be brought into contact both with the interior and exterior surfaces of the three dimensionally conformed polymer mixture.

It will be appreciated that there are many techniques by which the polymer mixture can be formed into a three dimensional configuration and that the invention is not limited to using an internal or male mould or former. Thus a hollow female mould could be used either alone or in combination with a male mould and the solution poured or injected into the space between the moulds.

Such hollow or concave moulds could be used to impart surface finishes or relief features during the coagulation without the need for a further finishing step.

The polymer is preferably dissolved in solvent but the term polymer extended with a liquid vehicle is intended to cover system in which the polymer is in emulsion, colloidal or gel conditions as well as those in which it can reasonably be described as being in solution. Such colloidal or gel conditions are conveniently achieved by addition of non-solvent to a polymer solution. Examples of this method are disclosed in British patent specifications Nos. 914,711, 946,069 and 984,088. However any method, such as addition of an electrolyte, as disclosed in British patent specification No. 1,126,060, which reduces the solubility of the polymer in the solvent can be used to achieve a colloidal or gel condition.

The disclosures of these four specifications are incorporated herein by reference.

The non solvent is preferably removed, as by drying, subsequent to the removal of the solvent, it merely being necessary that, whilst any solvent remains such as could cause disadvantageous reduction in permeability, sufficient non solvent remains to prevent this happening, for example by using a non-solvent with a higher boiling point than the solvent.

If the viscosity of the system is insufficient to enable sufficiently thick coatings to be formed it can be increased by cooling the mixture or adding thickening agents or by other conventional means.

A high vapour permeability was mentioned above as being desirable in shoe uppers for certain uses. Whilst a degree of porosity can occur when a layer of a polymer solution is bathed with a non solvent for the polymer miscible with the solvent, the pores formed whilst imparting some vapour permeability are liable to be not predictably or evenly distributed and may vary widely in size depending on a wide range of parameters.

An even fine pore size can be ensured by distributing evenly through the polymer solution finely divided particles of a removable filler which remain solid in the polymer solution or are arranged to be in a finely divided solid state whilst the polymer is coagulated and are removed at that time or thereafter for example by a leaching agent.

Thus according to this aspect of the invention the method comprises:

(a) forming a mixture comprising a solution of at least one polymer in at least one solvent, the said solution having evenly distributed through it particles of removable filler, for example a solid powder of an inorganic salt, (b) forming the mixture into a three dimensionally conformed layer, for example by coating a three dimensional former, for example a foot shape or a last, with the mixture, and (c) coagulating the polymer with non solvent for the polymer, which is preferably at least partially miscible with the solvent, and either at the same time or afterwards leaching out substantially all the removable filler to leave the polymer in a flexible microporous self-supporting form.

Any material which is essentially insoluble in the solvent for the polymer and is inert to the solvent and the polymer but which is soluble or can be rendered soluble by a liquid which has no deleterious effects on the polymer can be used as the removable solid filler. However, inorganic salts such as ammonium sulphate and particularly sodium chloride are preferred because of their ready availability and the ease with which they can be converted to a finely divided form. The use of such temporary fillers has the added advantage that the mixture containing such fillers has a substantially higher viscosity than the polymer solution or polymer extended with liquid vehicle and this facilitates the formation of the three dimensionally conformed layer. Whilst the preferred method of coagulating the polymer is to mash it or immerse it in a liquid non solvent for example water or water solvent blends for example of up to 40% or more dimethylformamide concentration, any other coagulating method can be used which deposits a continuous though water vapour permeable layer. Such other methods include cooling the mixture (e.g. to −78° C.), or subjecting the mixture to vapours of non solvent (e.g. to a humid atmosphere), or simply evaporating off the solvent, preferably at a rate slow enough to avoid the formation of macroporous bubbles or holes in the sheet, or using various combinations of these coagulating methods (e.g. freeze drying techniques) before removal of the removable filler material, which is preferably microscopic particulate material which preferably can be removed by dissolution or thermal decomposition. In place of, or together with, the salt particles, other pore-forming microscopic particulate material may be used. These particulate materials may be starch particles (which may be removed by treating the coagulated layer with an aqueous starch-digesting agent, such as an enzyme, of known type). Or they may be other microscopic solid particles which are insoluble in the polyurethane solution at least at the stage when the polymer is coagulated, for example urea, and which can either be dissolved out by treating the coagulated sheet with water or other suitable solvent for the particles which is a non-solvent for the polyurethane or can be otherwise destroyed or removed; examples of such particles are sodium carbonate, oxalic acid, ammonium carbonate, or suitable microballoons. Alternatively, the void-forming particulate material may be in the form of dispersed microscopic droplets of a liquid insoluble in the solution of polyurethane or in the form of dispersed microscopic bubbles of gas.

Additionally the pore formation could be controlled by dispersing removable or permanent fibrous fillers such as polyvinyl alcohol fibres or polyamide fibres or by incorporating permanent particulate fillers, such as silica, preferably of very small particle size for example less than 1 micron.

When a removable filler, such as sodium chloride, is used the pore size of the resultant water vapour permeable material depends to some extent on the particle size of the removable filler in the paste and if a microporous material is to be made then none of the filler particles must be larger than 100 microns, and preferably most are substantially smaller, for example less than 50 microns typically in the range 1 to 40 or 3 to 20 microns.

Preferably the ratio in parts by weight of filler to working material is in the range 1.5 to 1 up to 3.0 to 1 preferably about 1.7 to 1 up to 2 to 1 and the ratio in parts by weight of working material to solvent is in the range 20:80 to 40:60, for example 25:75 to 35:65 preferably about 28:72 to 32:68. Preferably the filler is ground so that more than 50% of the particles have diameters in the range 4 to 20 microns.

Many solvents are known for organic polymers and any suitable one can be chosen for the particular polymer used and preferably an organic solvent is used. However, for elastomeric polyurethanes, N,N'-dimethylformamide, dimethyl sulphoxide, N-methyl pyrrolidone, dimethylacetamide and tetrahydrofuran are particularly useful. Dimethylformamide, dimethyl sulphoxide, and the other solvents can be diluted with other cheaper solvents such as toluene and methylethylketone which although not solvents for polyurethanes on their own do not act as non-solvents when mixed with dimethylformamide or the other solvents mentioned above.

When a former is used it can be made of any material which will support a layer of the solution of the polymer in essentially the thickness in which it was laid down on the surface of the former for long enough to enable the polymer to be coagulated into self supporting form. Thus the surface of the former is preferably such as to facilitate the adherence of the polymer solution to it, for example it may be provided by porous polymeric plastics material. However materials as diverse as wood, metal, solid plastics, poly(ethylene glycol terephthalate) belting, wire gauze, Gowring poly(propylene glycol terephthalate) woven fabric and porous polymeric plastics materials can be used to provide the surface of the former but clearly if they art not inherently self supporting they must be supported in some way in the desired configuration or conformation.

The working material on coagulation will have undergone a certain amount of shrinkage and thus does not tend to slip off the former but in certain cases it may be desirable to use a material for the former to which the working material will positively adhere and from which it must be stripped though obviously it is necessary that the adherence should not be so strong as to cause this stripping step to be difficult or to be liable to result in any defects in the hollow article.

This stripping stage may result in a desirable drawing out of the inner surface of the hollow article imparting a smooth fibrous appearance to it having in certain cases a marked resemblance to the flesh surface of a leather produced from a natural hide, thus obviating the need for a shoe lining when the articles are used as shoe uppers.

One particular material, which is both self supporting and gives a very good flesh surface appearance, is a porous sintered polymeric plastics material especially one made from high density polyethylene and preferably having an average pore size of 50 microns as measured by the method described in British Standard Specification No. 1752:1963 using n-propyl alcohol. Such a material is sold under the name Vyon (trademark).

This material being thermoplastic can be easily shaped into formers of suitable shape for example foot, shoe or shoe last shapes by being heated and wrapped around a master former or last, or moulded in two halves which are then welded together.

It will be appreciated that such a hollow porous former has the advantage that the non solvent can be brought into contact with the coating of polymer solution from both sides at once.

Howere when a hollow former is used it must be provided with a vent so that air within it can escape when the former is dipped into the polymer paste; otherwise the air is likely to prevent the polymer solution adhering to the surface of the former. If this vent is in the form of a tube it enables the former to be fully immersed and this can be of advantage in increasing penetration of the surface of a porous former or any fabric reinforcement. This venting is also required if the dipped former is immersed in a non solvent since any air within the former is then liable to force the layer of polymer away from the surface of the former. A similar tube can also be used to supply the liquid non solvent to the interior of the former.

It has been mentioned above that the former should be such as to retain the layer of polymer solution of the desired thickness long enough for it to be coagulated; clearly the viscosity of the polymer solution is also important in this respect. This viscosity can be increased by increasing the concentration of the polymer, by increasing its degree of cure when a curable polymer is used resulting in a higher apparent viscosity for the polymer, by increasing the removable filler concentration or reducing its particle size or by the addition of conventional thickening or thixotropic agents which may remain in the finished material.

The polymer solution as coated onto the support desirably has a viscosity of at least 50,000 centipoise at 25° C. or at the temperature used and preferably in the range 100,000 centipoise or higher especially in the range 200,000 to 220,000, these viscosities being measured on a Brookfield LVT viscometer. However, viscosities in the range 15,000 to 1,000,000 centipoise may be useable.

At the upper end of the viscosity range it may be desirable to warm the paste to facilitate formation of an even layer and conversely at the lower end of the range the paste could be cooled to thicken the paste.

It will be appreciated that the variation of the parameters of polymer concentration and removable filler concentration for a given polymer concentration, i.e. filler to polymer ratio, will affect the properties of the article, an increase in filler to polymer ratio and a decerase in polymer concentration tending to produce a more open i.e. more permeable but less strong structure. A balance can conveniently be struck between these trends as discussed in the present applicants' copending U.S. patent application Ser. No. 14,710, filed Feb. 19, 1970 as a continuation of Ser. No. 697,164, now abandoned, and as also discussed in applicants' copending U.S. application, Ser. No. 697,154, filed Jan. 4, 1968, the disclosures of which are incorporated herein by reference.

Thus, if it is wished to produce a strong essentially microporous material with essentially no macropores visible to the unaided eye, for example using a thermoplastic essentially linear polyurethane derived from a polyester by reaction with a diol and a slight excess of diisocyanate dissolved in dimethylformamide and using sodium chloride as the removable filler and water as the leaching agent, then the polymer concentration is desirably in the range 25 to 35% w./w., especially about 30% w./w. and the filler to working material ratio is preferably in the range 1.5 to 1 to 2.0 to 1 in parts by weight.

If it is wished to produce a weaker but more open and plump material having a substantial number of macropores which result in softer more resilient material then using the same system the filler polymer ratio is selected to be about 0.5 to 1.

If an increased degree of curing in the polymer is used it will be appreciated that the properties of the article will differ but the permeability should be less affected than when the polymer concentration or filler polymer ratio is varied.

As mentioned above certain of the materials from which the surface of the former can be made may not themselves be self supporting in this case they can be supported by inflatable shaped interior supports which can be easily removed from inside the finished hollow article for example in the case of a shoe upper through the ankle hole. The surface of the support can then be discarded. Alternatively, if a rigid support is used the material can be peeled off from the support either from the ankle hole or by cutting a slit in the bottom or integral insole portion to which the sole will be attached, or by cutting a slit down the heel.

The article may be formed in a single coating step with a thickness of the order of 0.030" for ladies' shoes up to 0.090" and higher for men's weight shoes. The higher thickness can be, if necessary built up in a series of coatings.

In one form of the invention a first microporous coating, for example 1 mm. thick, is formed for example with a polyurethane made with an excess of diisocyanate and then a second layer of a different polyurethane, for example an Estane, in a solvent which does not destroy the porosity of the first layer and with a removable filler, is formed, and the solvent removed by evaporation and then before the filler is removed from this tie layer, which is preferably relatively thin, for example 0.03 mm. thick, a topcoat of the polyurethane used for the substrate for example 0.50 mm. thick is formed on the tie layer and coagulated and the filler leached from both tie layer and topcoat, the composite material dried, optionally lacquered or spray finished by spraying with a solvent for the top coat so as to partially collapse the porous structure of the top coat without destroying its permeability or affecting the remainder of the thickness of the material, the hollow article stripped from the former and in the case of a shoe upper a sole attached to the upper. A sole can be stitched or glued to the upper and a thermoplastic sole can conveniently be welded to the shoe upper thus producing an inherently water-resistant shoe construction.

The shoe upper can be embossed on or off the former with desired patterns and can also be reinforced by compression for example in the toe puff and counter areas. Additional parts could also be attached by RF welding techniques.

The former can be coated by any suitable method but dipping the former in the polymer solution is particularly convenient and an adequately even coating can be achieved by suitable selection of the former material and the viscosity of the polymer system which for a substrate layer is preferably about 200,000 centipoise and for a top coat layer about 40,000 to 45,000.

Reinforcement of selected areas can be achieved by building up the thickness of selected areas by redipping those areas, e.g. toe cap or counter. Alternatively or in addition as mentioned above reinforcement can be achieved by placing or lightly attaching reinforcing parts for example of fabric or polypropylene on the former before dipping or between coats so that they are incorporated in the article during the dipping process. Additional components such as top line tapes, stiffeners, tongues and other embellishing features can also be incorporated at this stage.

The polymer solution can be coagulated by any suitable method, e.g. "moist" vapour, spraying, immersion or washing but dipping in the non solvent leaching agent is particularly convenient.

The polymer is coagulated relatively rapidly but the non solvent treatment should be continued until insufficient solvent remains to cause any pore collapse on drying the hollow article. At 20° C. about ½ hour should be sufficient to produce a self-supporting article using the specific system mentioned above. When a removable filler is used a longer treatment will be required to ensure removal of substantially all the filler. It may be advantageous to strip the article from the former prior to this final leaching.

It will be appreciated that the leaching agent for the filler does not need to be the same as that for the solvent, thus for example when the solvent is dimethyl formamide, it could be removed by methanol and the filler for example sodium chloride could be removed with water.

The invention may be put into practice in various ways. Examples 1, 2, 4 to 10, 12, 13 and 15 illustrate a number of specific embodiments as applied to shoe uppers and shoes incorporating the improved uppers of the invention; it will be recalled that the invention is applicable to the production of many other types of shaped articles of permeable polymer material.

Examples 3, 11, 14 and 16 illustrate shoe uppers and shoes made by lasting techniques and are by way of comparison.

In the accompanying drawings;

FIG. 8 is a stress strain curve for the polymer used in

Figure 2:
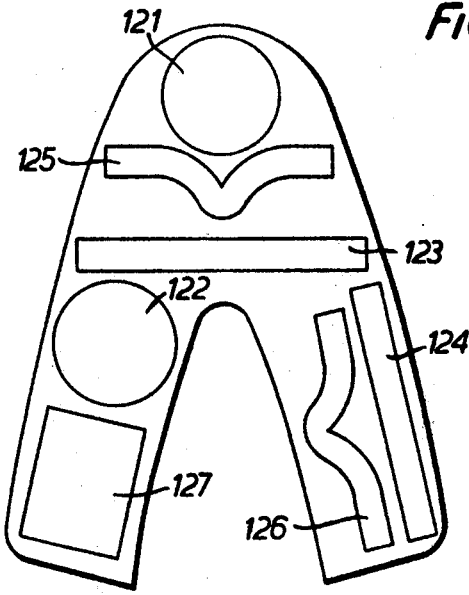
FIG. 2 is a diagrammatic plan view of an upper made in accordance with Example 1 when removed from a shoe as illustrated in FIG. 1 showing the areas from which samples were taken to measure the physical properties of the upper quoted in Table 1.
Figure 10:
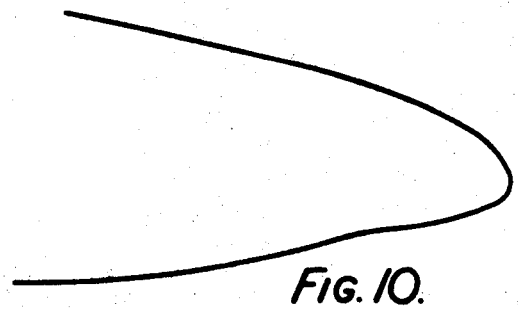
Figure 11:
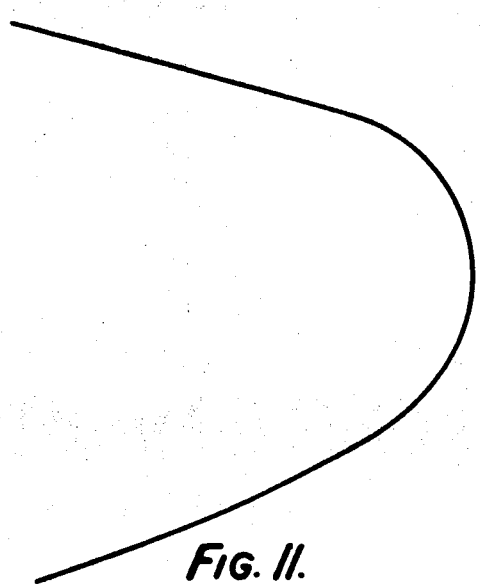
Figure 12:
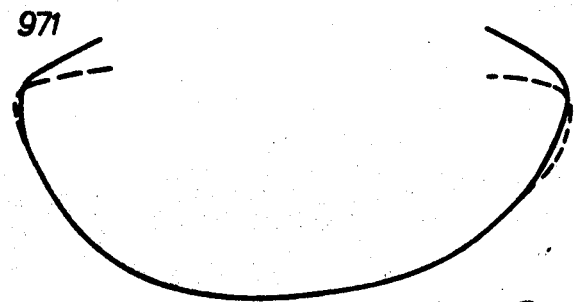
Figure 14:
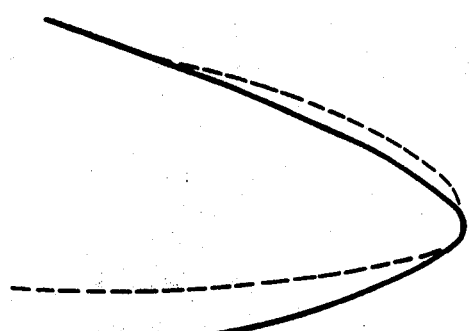
Figure 15:
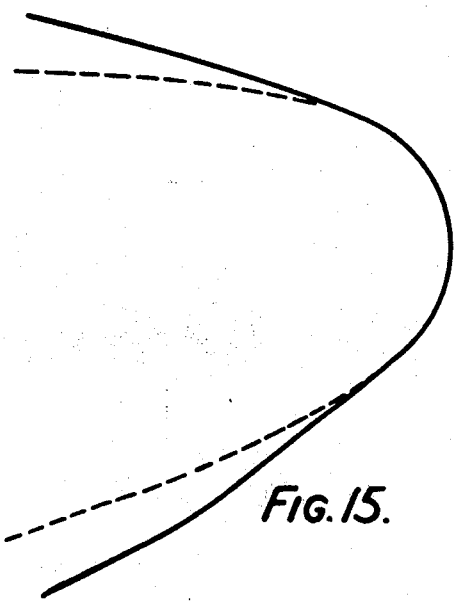
Figure 16:
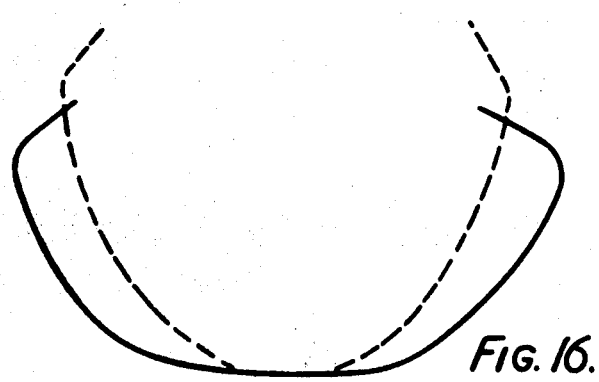
Figure 18:
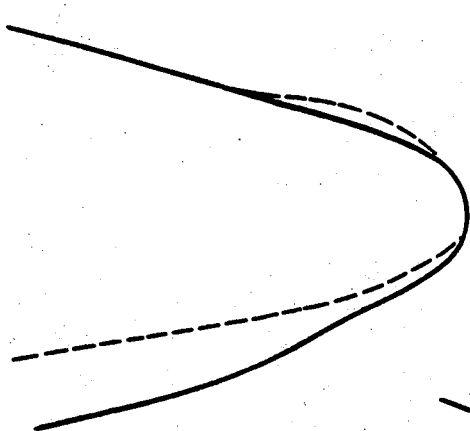
Figure 19:
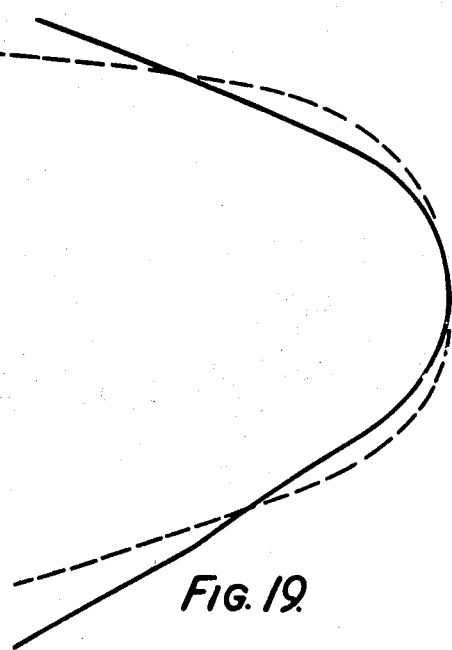

Example 9 showing the curve up to the breaking point of the sample;

FIG. 9 is a view similar to FIG. 2 for an upper made as described in Example 9 for use with Table 5a;

FIG. 10 is a side elevation of the toe cap of the shoe described in Example 9;

FIG. 11 is a plan view of the toe cap shown in FIG. 9;

FIG. 12 is a view in the direction of the arrow A in FIG. 11 showing the regain of shape after heating;

FIG. 13 is a view similar to FIG. 2 for an upper made as described in Example 10 for use with Table 5b;

FIG. 14 is a side elevation of the toe cap of the shoe described in Example 11;

FIG. 15 is a plan view of the toe cap shown in FIG. 14;

FIG. 16 is a view in the direction of the arrow A in FIG. 14 showing the loss of shape after heating;

FIG. 17 is a view similar to FIG. 2 for an upper made as described in Example 15 for use with Table 7;

FIG. 18 is a side elevation of the toe cap of the shoe described in Example 16;

FIG. 19 is a plan view of the toe cap shown in FIG. 18; and

Figure 20:
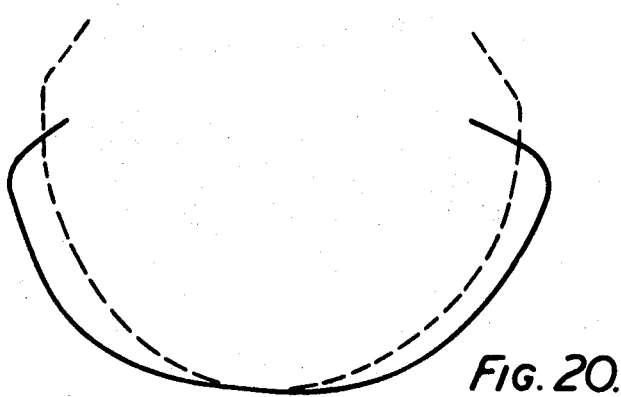

FIG. 20 is a view in the direction of the arrow A in FIG. 19 showing the loss of shape after heating.

In the examples all parts are by weight unless otherwise indicated.

EXAMPLE 1

Figure 1:
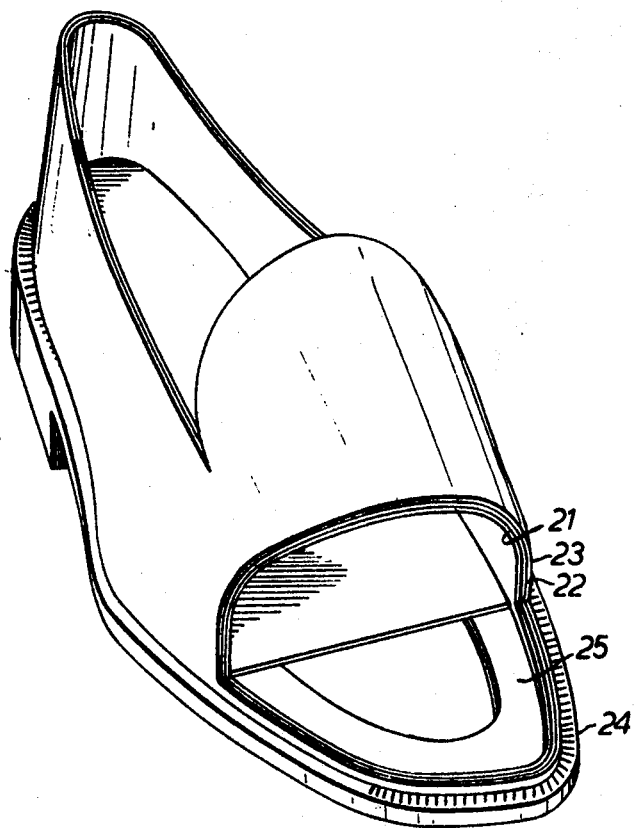
FIG. 1 is a perspective part sectional view of a shoe made in accordance with Example 1.

This describes the production of a men's casual shoe without laces. The shoe upper was formed of three unitary layers of microporous polyurethane, which will be described as the substrate tie coat and top coat layers 21, 22 and 23 and the top coat was finished with a brown acrylic emulsion finish. The upper has a turned under integrally formed portion 25. The finished shoe is illustrated in FIG. 1. It has a moulded rubber sole 24 attached with conventional shoe making adhesives to the portion 25. In an alternative (not shown) the underneath of the upper is retained to form an integral insole providing an extra area to which the sole can be attached and obviating the need for a separate insole.

The upper was made as a unitary single piece material by dipping a Vyon former in the shape of a shoe last into a polymer solution having microscopic sodium chloride particles dispersed through it and then immersing the former with the thick coating on it into water to coagulate the polymer to self supporting water vapour permeable form and leach out substantially all the solvent and the sodium chloride. The material was then dried. It was then dipped in a different polymer solution also having microscopic salt particles dispersed therethrough to produce a thin tie layer which was air dried. Then the material was dipped again in a solution of the same type of polymer as used for the substrate again containing microscropic salt particles immersed in water to coagulate the polymer to vapour permeable self supporting form and remove the salt from the tie layer and top coat and then dried.

A surface modifying finish was then applied to the coat.

One very suitable finishing operation is a treatment of the upper surface with fine droplets of a solvent and heating, in a manner to partially collapse the microporous structure along the surface and form a thin fused polyurethane skin thereon; materials so finished often have a series of tiny spaced depressions, partially lined with fused polyurethane material (e.g. about 2 to 15 microns in thickness), at said surface. Another suitable finishing treatment involves applying to the upper surface of the microporous material a thin top coat, such as an aqueous emulsion of a suitable polymer (e.g. an alkyl acrylate polymer or copolymer such as a copolymer of butylacrylate with some 15% of acrylonitrile and about 1-2% of itaconic acid, which can be cross-linked on heating by the inclusion of ureaformaldehyde condensation product in the emulsion, as is well known in the art); the amount of such polymer may be insufficient to close the pores, or sufficient to provide a very thin layer, less than about one micron in thickness, whereby the appearance of the material is improved without unduly decreasing its ability to transmit water vapour. The top coat may be a continuous layer which imparts a glossy "patent" finish to the material; thus one may apply a conventional organic solvent solution of polyvinyl butyral mixed with solvent-soluble melamine-formaldehyde resin, and evaporate off the solvent and cure (cross-link) the mixture of these two resins. Still another suitable finishing treatment is a dyeing of the material with a solution of a solvent dye (such as an "Irgacet" dye, which may be of the type described in U.S. Pat. 2,551,056, dissolved in methanol); in one preferred form of the invention such dyeing precedes the treatment with solvent spray or the application of the top coat, or both.

In yet a further alternative form of colouring treatment a dye is contained in the non solvent in which the polymer is coagulated. The dye may be an "Irgacet" dye as mentioned above and the non solvent may be an aqueous alcoholic solution of the dye. Further details of the process and examples of other suitable dyes are disclosed in U.S. application Ser. No. 820,922, filed May 1, 1969, the disclosure of which is incorporated herein by reference.

The turned under portion could have holes punched in it or holes could be formed by suitable protrusions on the former during the moulding or dipping operation. On removing the upper from the mould or former these protrusions could be trimmed off to leave holes in the insole portion. These holes would facilitate attachment of injection moulded soles and adhesively joined outsoles to the insole portion and thus to the upper.

The Vyon material was made by spreading an even layer of Ziegler high density polyethylene powder on a smooth metal surface and then heating the layer on the metal surface to cause the powder to fuse at its points of contact to produce a rigid self-supporting but flexible sheet. The surface of the layer which was in contact with the metal surface is smoother than the other surface and preferably this is used as the outer surface of the former on which the polymer solution is coated. A preferred form of Vyon is $0.067''\pm 0.004''$ thick, has a permeability of $18\pm 4$ cubic ft. air per square foot per minute at a pressure of 8" static water guage and weighs 114 grams/ft.$^2$ Another suitable grade has a permeability of $60\pm 4$ cubic ft. air per sq. ft. per minute at 1" S.W.G.

The former was made from this preferred type of Vyon by heating it until it was pliable and then wrapping it round the upper surfaces of a men's shoe shape or shoe last and sealing the material together down the back seam of the last to form a Vyon shell. This shell having the smoother Vyon face outwards and an external configuration corresponding to the last was then removed from the last and a sheet of Vyon welded to the underneath of the Vyon shell to produce a hollow former with a porous structure and a permeable surface. Vent tubes allowing water to get to the interior of the former and air to escape from it were inserted through and attached to the shell at the top end of the vamp area. Weights were also placed inside the former to keep it below the surface of any liquids or pastes in which it was to be immersed in use.

As mentioned above a shoe upper or slipper can be made in a single coating step but this example uses three coatings which gives greater opportunities for adjusting the appearance and properties of the product.

The substrate polymer is made as follows: The starting material is a linear polyester, based on adipic acid and a mixture of ethylene glycol and 1,4-butane-diol.

The polyester has the following physical properties:

Mean molecular weight—approx. 2000
Hydroxyl value—50–60
Hydroxyl content—1.5–1.8%

Acid value—<2.0
Viscosity at 75° C.—500–700 centipoise
Water content—<0.15%

The polyester is thoroughly dehydrated under vacuum and 100 parts thereof are then weighed out into a reaction vessel and heated to 105° C. and 22.0 parts of weight of warmed (450° C.) liquid, 1,4-butane-diol added with stirring and the stirring continued for 30 seconds. 80 parts of powdered solid 4,4'-diphenylmethane-diisocyanate is then added in one batch and the mixture stirred thoroughly. The temperature of the reaction mixture falls initially to approximately 60° C. but then rises rapidly again and after 90 seconds should have reached 80° C.

The liquid mixture is then poured into a tray heated to 125° C. After 3 minutes the now solid polymer is removed from the tray and placed on a cooled table until it has cooled to room temperature and is then stored in closed bins for 12 to 24 hours, granulated, cooled, and tumbled in a tumble blender until the granulate is completely homogeneous. At this stage, its intrinsic viscosity is about 0.3 to 0.5 decilitre/gram (measured in solution in dimethylformamide containing, for instance, 1% dry methanol by volume to prevent polymerization of the material). 13.4 kilogrammes of this polymer were dissolved in 31.6 kilogrammes of N,N'-dimethylformamide using a high speed high shear Silverson mixer. The temperature reached a maximum of 75° C. at which stage a small amount of water was added to prevent any further chain extension. 5.4 kilogrammes of the same polymer were dissolved in 12.6 kilogrammes of N,N'-dimethylformamide using a Silverson mixer. The temperature reached a maximum of 43° C. and water was again added to prevent any further chain extension. The solution had gelled by this stage. These two solutions were mixed for 45 minutes on a Beken paddle mixer and then milled three times to give a solution containing approximately 30% polymer solids.

Approximately 1.8 parts of finely divided sodium chloride per part of polymer was then mixed into the polymer solution and then milled three times on a Torrance triple roll mill to evenly disperse the sodium chloride. The paste after milling has a Hegman gauge reading such as to indicate that essentially no particles having a diameter in excess of 25 microns were present.

The sodium chloride was ground in a pin and disc mill with air classification to separate out fines and return oversize particles for regrinding. The sodium chloride powder before dispersing in the polymer solution typically had an average particle size of the order of 10 to 20 microns usually about 13 to 17 microns with a standard deviation of the order of ±10 microns. This measurement was made by sedimentation measurements using a Photo-Extinction Sedimentometer manufactured by Evans Electro Selenium Ltd., Model No. 41 used in accordance with the manufacturer's instructions based on papers by H. E. Rose in Engineering of Mar. 31 and Apr. 14, 1950 and Nature of 1952, volume 169, page 287.

This apparatus consists of a chamber in which the solid whose particle size is to be measured can be dispersed ultrasonically in a liquid and its rate of settling measured optically. The change in transmission of light by the dispersion with time is related to the particle sizes of the particles and the measurements of this change enable the average particle size to be calculated.

It will be appreciated that these sedimentometer experiments give an indication of the general order of particle size of the majority of the particles.

Shadow photography of typical samples of the ground salt has indicated that the salt particles have random rough irregular shapes including quite elongated shapes as well as more compact cube or block shapes.

The dispersions typically contain a few particles having a maximum dimension as large as 70 microns but substantially all of the particles are less than 40 to 50 microns, and most are less than 25 to 30 microns in maximum dimension and have dimensions in the range down to 1 micron or so though a few may be even smaller. The salt is also selected to have a low moisture content so that it doesn't cake, for example of less than 1% preferably less than 0.5% and especially in the range 0.2–0.4%. It also has an anticaking agent added namely Microcal at about 1% by weight. Microcal is a very fine particle size coprecipitated lime and silicate anticaking agent sold by Joseph Crosfield & Sons Ltd. The mixing and milling conditions are preferably carried out at relative humidities less than 70% at 25° C. and preferably at about 50%.

This substrate paste had a viscosity of 80,000–90,000 centipoises, at 25° C.

The former is immersed in this paste while inclined at an angle with the toe down so that the vent is at the highest point and the air can escape from all parts of the interior of the former.

The former is then removed from the paste at the rate of 2 inches per min. and then immersed in water at 25° C. for 24 hours and then dried producing a layer about 1 to 1.5 mm. thick.

Figure 3:
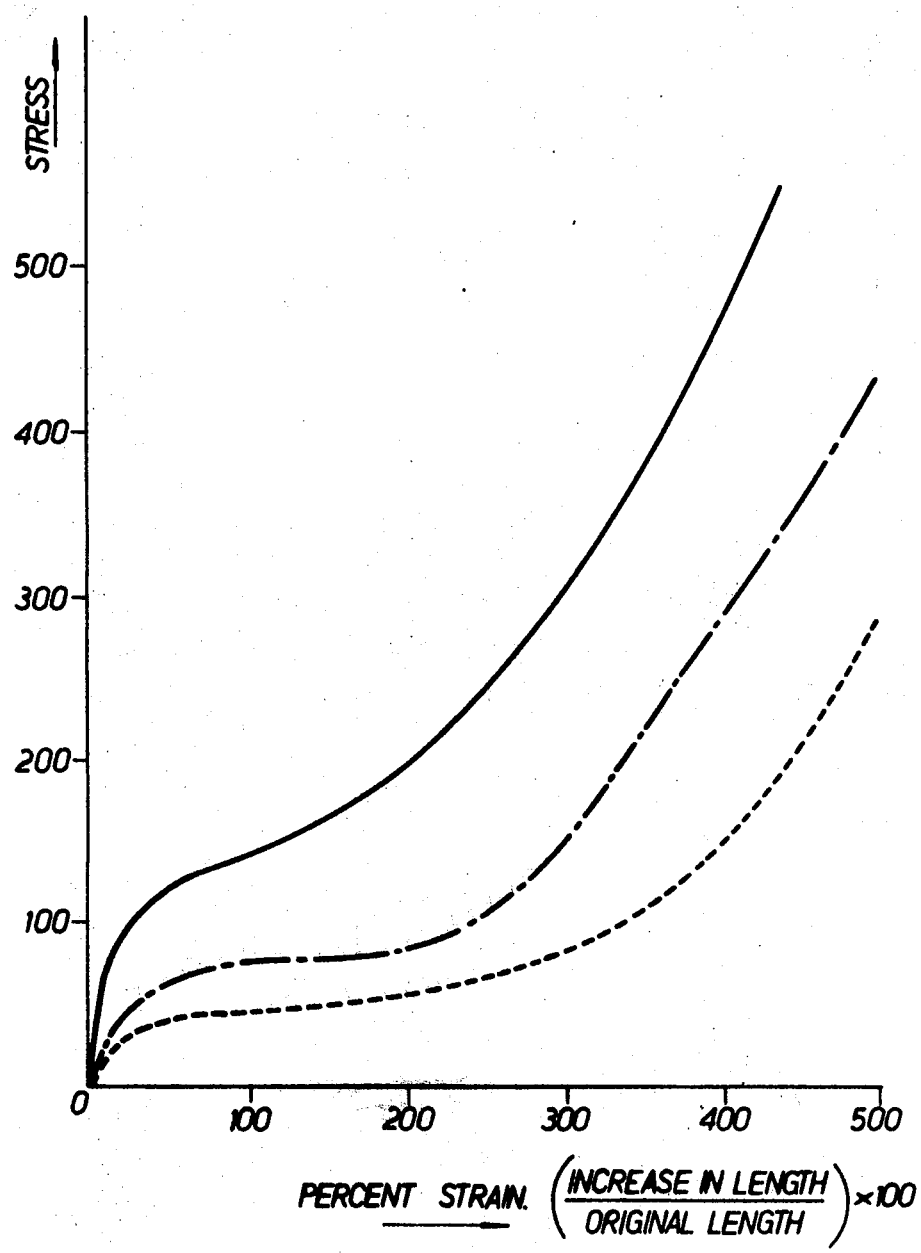
FIG. 3 shows a stress-strain curve (full line) for the type of polymer used in the substrate in Example 1, and similar curves for the polymer used in the tie layer, the chain line being plotted from the "Rubber Age" article referred to herein, and the dotted line being plotted from the "Rubber Chemistry and Technology" article referred to herein.

The tie coat polymer was the commercially available material known as Estane 5740X1 or 5701F1. As disclosed in the article by T. T. Stetz and J. F. Smith in "Rubber Age" of May 1965, pages 74 to 79, these polyurethanes are made in accordance with U.S. Pat. No. 2,871,218. The disclosures of these documents are incorporated herein by reference. FIG. 3 illustrates the stress/strain characteristics of this polymer as illustrated in FIG. 1 of the Stetz and Smith article.

13.8 kilogrammes of this polymer were dissolved in 46.2 kilogrammes of dimethylcyclohexanone. A 10% diluted solution had a viscosity of about 8000 centipoise at 25° C. 43 kilogrammes of this solution were mixed with 29.7 kilogrammes of finely ground sodium chloride of the same order of particle size as used in the substrate and 5 kilogrammes of a dimethylcyclohexanone solution of Estane 5740X1 polymer containing Madeira blue pigment so that the finished paste contained 0.25% pigment and 23% polymer solids. The paste had a viscosity of 25,000–32,000 centipoise at 25° C. using a Brookfield viscometer in accordance with the makers instructions.

The substrate layer on the former was then trimmed to shape and the former immersed as for the substrate layer in the tie coat paste. The former was removed from the tie coat paste, with a layer of tie coat paste adhering to the surface of the substrate layer, at a rate of 2 inches per minute and briefly dried with a stream of hot air at 40° C. to 100° C. from a hair drier to set the layer before the solvent was evaporated off in an oven at 60° C. over a number of hours. The tie coat thus produced was 0.05 to 0.4 millimetre thick.

The top coat polymer was made in the same manner as the substrate polymer and had similar physical properties. A 30% solution in N,N'-dimethylformamide was prepared and 3 parts of finely ground sodium chloride, of the same order of particle size as used in the substrate, per part of polymer were evenly mixed and milled into the polymer solution.

The paste was deaired and the former again immersed in the paste in the same way as for the substrate and tie layers and again withdrawn from the paste at 2 inches/min. and immersed in water at 27° C. for 48 hours to coagulate the polymer and remove substantially all the sodium chloride from the tie layer and top coat layer. It was then dried in a steam oven to produce a top coat about 0.5 mm. to 0.8 mm. thick.

The top coat was then spray lacquered with an acrylic emulsion finish to produce a very thin discontinuous top coat of polyacrylate ester (Earnshaws Ltd., "Encryl F.W.") at about 10 grams per square metre.

This produced a material with a grain leather-like appearance and "break." A leather-like break is the pattern of fine creases produced when a grain leather is folded on itself with the grain surface inside the fold.

The material covering the base of the former, integral insole was then cut from end to end and transversely across the sole and the hollow article stripped off the former. The integral insole was then timed to leave only a partial insole portion or turn in 25. The interior had an appearance resembling the flesh surface of natural leather.

A thermoplastic polymer sole 24 was then stitched glued to the turn in 25 and thus to the integral shoe upper.

The ankle hole was then trimmed and finished and an insole placed inside the shoe. The shoe was flexible, vapour permeable, resistant to ingress of liquid water and abrasion resistant.

The shoe upper was subsequently removed from the shoe and cut up as indicated in FIG. 2 of the accompanying drawings to enable the physical properties of the material of which the upper was composed to be measured.

Samples 121 and 122 were used to produce two measurements each of water vapour permeability in grams per square metre per hour or 24 hours, hydrostatic heat in millimetres of mercury and pore size in microns in that order.

Sample 127, 6.25 cms. by 6.25 cms., was used to produce one measurement each of weight in grams per square metre, coating thickness in millimetres of spray coat, top coat, tie coat and substrate using a microscope with a travelling crosswire thickness gauge, and Satra flex life in hours to initial failure at 0° C. in that order.

Samples 123 and 124 were used to produce two measurements each of initial modulus in kgs./cm. at 25% extension, ultimate tensile strength in kgs./cm. and extension at break as a percentage of the original length. An Instron tensile testing machine was used and the method apart from the sample shape was as described in British standard specification No. 3144/1968 using a 1000% per minute rate of extension at room temperature.

Samples 125 and 126 were used to produce two measurements each of notch tear strength in kgs., the force required to initiate a tear from a notch of standard shape, and rupture the standard shaped sample.

The results are given in Table 1 below.

Water vapour permeability is measured as follows:

A 33 millimetre high 70 millimetre diameter jar with the top closed with a screw on cap having a 60.5 millimetre diameter hole in it occupied by a 67.4 millimetre diameter sample of the microporous material is used in an air conditioned cabinet maintained at 37±1° C. and at zero relative humidity by means of silica gel.

25 millilitres of distilled water are placed within the jar and the change in weight "$w$" in a specified time "$t$" measured 4 hours after placing the jar in the cabinet and again at least 5 hours later is recorded. The water vapour permeability $$\text{"wvp"} = \frac{336.6w}{t}$$

grams per square metre per hour at 100% RH and 37° C.

For comparison the values measured by the method described in British standard specification No. 3177/1959 but at 37° C. and a nominal humidity gradient of 100% relative humidity are also included.

Hydrostatic head is measured by the method described in British standard specification No. 2823/1947.

Pore size is measured by a method similar to those described in British standard specifications Nos. 3321/1960 and 1752/1952. The apparatus used consists of an air supply controlled by a pressure regulator and the pressure measured by a pressure gauge reading 20 p.s.i., plus a water or mercury manometer for greater sensitivity and a test jig. The test jig is a metal cylindrical cell fitted with an air inlet attached to the controlled air supply and has a top opening of about 3 cm. internal diameter, with a flat machined face, fitted with a screw-on clamping ring designed to retain a small pool of liquid on the surface of the test piece when the cell is assembled.

Circular samples to fit the test cell are thoroughly saturated with the test liquid (n-propanol) and held firmly over the aperture of the test cell, top coating side up, by means of the clamping ring. The surface of the sample is covered with a shallow layer of the test liquid. The air pressure is increased, and when air bubbles break from the surface of the sample at one location, the pressure is recorded and relates to the maximum pore size. The pressure is increased further until bubbles emerge uniformly from the whole of the surface, at this point the pressure which relates to the average pore size is also recorded. The pressure readings are converted to equivalent pore diameters in microns, using the following equation.

$$d = \frac{30T}{P}$$

where:

$T$ = surface tension of the liquid in dynes/cm. (n-propanol = 24 dynes/cm.), and
$P$ = pressure in mm. of mercury.

The weight in grams per square metre was measured by the method described in British standard specification No. 3144/1959 except that the sample size used as mentioned above was 6.25 cms. by 6.25 cms. The sample is conditioned for 48 hours immediately prior to being weighed by being kept in a standard atmosphere of 20° C. and 65±2% relative humidity. The specimen is supported so that the conditioned air has free access to all its surfaces and the conditioned air is kept in continuous motion.

Satra flex life at 0° C. is measured in the manner described in Satra leaflet STM101 and involves the use of a Satra upper flexing machine. The machine consists of six pairs of U-shaped clamps, mounted so that each pair is diametrically opposed. One clamp is fixed and the other moves towards it and back again in the same plane at a rate of 300 cycles per minute. A stroke of ¾ in. and a minimum spacing of ⅜ in. is used. A specimen 2½ in. by 2½ in. is cut from the sample and clamped in the U-shaped clamps with the coated side outwards when the jaws are at their greatest separation. The jaws are then slowly brought together manually and the specimen bent inwards to form the main crease across the specimen. As each specimen is clamped, the machine is turned over by hand for a few cycles to ensure that the correct crease pattern is formed and the machine then set running at 300 cycles per minute.

At periodic intervals the machine is withdrawn from the test chamber and the samples inspected for failures as quickly as possible. The machine is then replaced and the flexing continued, inspections taking place at further periodic intervals.

It has been found more convenient to express flex life measurements in hours rather than the more cumbersome measure of thousands or millions of flex cycles.

Samples are inspected with the aid of a powerful torch when the clamps are closest together, to emphasize any failures to the edge and diamond, and apart, to emphasize failures in the centre crease of the specimen. The environmental temperature of the refrigerator is maintained at 0±3° C. A small fan is operated to assist in achieving a uniform temperature distribution.

The flex life of the samples are reported as two numbers these are the hours of elapsed flexing during which the first sign of a blemish or crack appear in the top coat surface. A result quoted as 6–24 hours means that at 6 hours there was no failure but at 24 hours a failure had occurred.

The notch tear strength was measured on an Instron tensile testing machine using the method described in British standard specification No. 2782:3/308A/1965. The specimen is cut with a single stroke of a press using a knife-edged punch with cutting edges of the form and dimensions shown in Fig. 308.108 of the above British standard.

The jaws of the testing machine are set 5 cms. apart and the ends of the specimen gripped in the jaws. The jaws are then separated at 100 cms. per minute and the load at which a tear is initiated at the notch is recorded. These values at 100 cms. per minute are equivalent to the value at 12 cms. per minute multiplied by 1.13.

TABLE 1

| Test | | 121 | 122 | 123 | 124 | 125 | 126 | 127 |
|---|---|---|---|---|---|---|---|---|
| Water vapour permeability | BSS 3177 | 2,485 / 50 | 2,175 / 70 | | | | | |
| Hydrostatic head | | 330 | 130 | | | | | |
| Pore size: | | | | | | | | |
| Maximum | | 2.4 | 4.0 | | | | | |
| Average | | 1.5 | 2.7 | | | | | |
| Ultimate tensile strength | | | | | | 11.0 | 10.8 | |
| Initial modulus (25%) | | | | | | 3.8 | 4.0 | |
| Extension at break | | | | | | 331 | 310 | |
| Notch tear | | | | | | | 4.3 | 9.5 |
| Satra flex life (0° C.) | | | | | | | | 6–24 |
| Weight/square metre | | | | | | | | 969 |
| Coating thickness: | | | | | | | | |
| Spray coat | | | | | | | | 0.015 |
| Top coat | | | | | | | | 0.60 |
| Tie coat | | | | | | | | 0.37 |
| Substrate | | | | | | | | 0.98 |
| Average density (calculated) | | | | | | | | 0.49 |

EXAMPLE 2

Tests were made on a further shoe made in an identical manner to that described and illustrated in Example 1 to test the shape retention capabilities of the toe area.

This area was selected because it is that part of the shoe which when lasted from a flat sheet of upper material has to be subjected to the greatest extensions, which may be as much as 40 or 50% in some cases, and typically are of the order of up to 25%. In order for these extensions and thus the toe shape to be retained when the upper is removed from the last the stretched material has to be held in position on the last conventionally for several weeks at room temperature or in improved heat setting techniques typically at 100° C. or higher for a number of hours optionally in the presence of moisture. This is believed to cause the stresses in the stretched material which would normally tend to return it to its flat shape to decay and the shoe thus holds its shape to some extent. However the lasts are shaped so as to allow some fall in of the upper immediately it is removed from the last and whilst this process slows down it still continues with time and is accelerated if the shoes are used in hot conditions.

The toe area, broadly including the area occupied by samples 121 and 125 in FIG. 2, was cut from a shoe made identically to that described in Example 1. It was placed in an air circulating oven at 130° F. for 2 hours during which no change in area occurred; at this stage the area beneath the toe cap was square cms. After 0.75 hour at 160° F. there was no significant change and after a further 2.75 hours at 220° F. the area had only increased to 30.4 square cms., a percentage increase of 6.0%. The toe cap still had substantial shape. After 9 hours under moderate flattening pressure at room temperature the area was 36.5 square centimetres, after 1.5 hours at 220° F. the toe cap recovered a large proportion of the shape it had lost due to the deformation; the area now being 32.5 square centimetres, a percentage decrease of 11%.

It will be appreciated that the pressure deformation was largely in a bending mode around the median line of the toe cap. It is thus remarkable that there was an significant tendency to regain its shape after this deformation.

EXAMPLE 3

This describes the production of a plain toe Oxford men's shoe. The shoe upper was formed from a two layer microporous polyurethane material which had been spray finished to impart a grain leather-like surface appearance and break as described in Example 1 and then annealed by heating in an unsupported state at 160° C. for 5 minutes to produce a shrinkage in area and improved flex life.

The material from which the upper was formed was made as follows:

The polymer used for the substrate was made in the same way as Example 1 except that 110 kg. of polyester were reacted with 88 kg. of diisocyanate and 25 kg. of butane 1,4 diol.

The polymer used for the top coat only differed in that 51 kg. of polyester were reacted with 40 kg. of diisocyanate and 11 kg. of butane 1,4 diol.

62 kg. of the substrate polymer were dissolved in 32 British gallons of N,N'-dimethylformamide containing 70 grams of methanol keeping the temperature below 40° C. During this process some further reaction occurred in the polymer and its intrinsic viscosity in solution had risen to 0.82 and the solution had a solids content of 31.4%.

The top coat polymer was dissolved in the same way but using only 60 grams of methanol so that more reaction occurred and the intrinsic viscosity rose to 0.86, the solids content being 31%.

A pigment master batch was made up using substrate polymer solution, 38.8 kg. of which were dissolved in a solution of 0.8 kg. of Irganox 1010, 3.2 kg. of Cyasorb UV 24 and 2.4 kg. of Staboxol in 33.2 kg. of dimethylformamide. 8.0 kg. of Rajah black carbon black were then mixed and milled into this solution to produce an even dispersion. The Irganox 1010 material is tetrakis [methylene 3 - (3'5' ditertiarybutyl-4'-hydroxy phenyl) propionate] methane and is an antioxidant. The Staboxol is a carbodiimide and acts as a stibilizer for polyurethanes against hydrolytic degradation.

The Cyasorb UV 24 material is a stabilizer for the polyurethane to degradation by ultra violet rays, and is 2,2'-dihydroxy-4-methoxy-benzophenone. The Rajah black pigment is made by the channel process by Columbian International and is stated by them to have an average particle size of 0.02 micron, a surface area of 156 square metres per gram, an oil absorption to produce a fluid paste of 11.3 millilitres per gram and to produce a stiff paste of 1.23 millilitres per gram, a carbon content of 95.2%, and a volatile matter content of 4.8%.

A substrate paste was then formed by dissolving 138 grams of Staboxol in 1.24 kg. of dimethylformamide and mixing 41.3 kg. of the substrate polymer solution with it. 25.62 kg. of finely ground sodium chloride and 690 grams of the pigment master batch were then mixed and milled in to produce an even dispersion.

The salt had an average particle size of 14.3 microns with a positive deviation of 7.4 microns and a negative deviation of 7.6 microns. It contained 1% of Microcal and 0.16% moisture. The substrate paste contains 2 parts of salt per part of polymer.

A top coat paste was then formed by mixing 31.5 kg.

of top coat solution with 7.52 kg. of dimethylformamide. 5.7 kg. of the pigment master batch and 31.6 kg. of the same salt as used for the substrate were then evenly mixed and milled in to produce an even dispersion.

The two pastes were then fed to a double head knife over roll coating device over the roll of which was lead a Vyon belt of the same materials as used in Example 1. This arrangement consists of two knife blades and a backing plate extending across and above a roll so as to form two troughs, the upstream trough in the direction of movement of the belt contains the substrate paste and the gap between the middle blade and the surface of the belt for a given paste determines the wet thickness of the substrate layer, in this case it was 0.105 inch. The downstream trough contains the top coat paste and the separation between downstream blade and the surface of the belt for a given pair of pastes determines the wet thickness of the top coat paste; in this case the gap was 0.130 inch.

The spreading speed was 15 feet per minute and the paste was carried upside down beneath the surface of a tank of water of about 16,000 parts per million chloride ion content at 20° C. within about ¼ of a minute of being spread. It remained in this tank for 65 minutes after which time the chloride ion content had risen to about 18,000 parts per million or 1.8%. It was then held in a tank of water for 27 hours after which time the chloride ion content of the tank was about 900 parts per million.

The material was then removed from the backer and passed twice through a counter current of water at 60° C. after which it had a chloride ion content of about 800 milligrams per square metre having had a value before leaching of as high as about 60,000 milligrams/square metre. The material was then dried at 98° C. The material had the following physical properties weight 766 (measured on a 10 cm. x 10 cm. sample. Otherwise as in Example 1); thickness substrate 1.14 top coating 0.62 (as in Example 1); tensile strength L 13.8, $\times$14.3 (as in Example 1); elongation L 425, $\times$476 (as in Example 1); initial modulus (5%) L 1.3, $\times$1.1 (as in Example 1); notch tear L 5.7, $\times$6.3 (as in Example 1); water vapour permeability 1340 gms./square metre/24 hours at 37° C. and 100% relative humidity by the method described in British standard specification No. 3177/1959; Satra flex life at 0° C. greater than 40 hours (as in Example 1); pore size (max.) 9.4, (average) 3.5 (as in Example 1); hydrostatic head 170 (as in Example 1); average density (calculated) 0.44.

The shoe upper components were cut from the sheet material, the edges skived, and the components fitted and stitched. The upper was then mulled overnight in the conventional manner. The uppers were then pulled over the last with minimum tension, side staple lasted, heel seat lasted and toe lasted. After lasting the shoes were heat set passing through a two zone apparatus in 4 minutes the surface temperature of the uppers in the moist heat zone was 240° F. as measured by a "Pocket probe" pyrometer, indicated temperature 275° F., and in the dry heat zone 250° F., indicated temperature 275° F. The surface temperature of the shoes coming out of the heat setter was 120° to 140° F.

The uppers were then bottomed, an out sole attached, and finished. The shoes had an excellent overall appearance. After 4 months wear the shoe had retained its shape and appeared adequately. The toe cap was cut off and the upper material stripped from the fabric liner and toe puff. The upper was self supporting in its lasted shape and when rested on a flat level surface the area beneath the toe cap was 41.3 square cms. and the highest point on the toe cap was 2.7 cms. above the surface on which it rested. After 2½ hours at 130° F. the area beneath the the toe cap was 41.3 square cms. and the highest point on toe cap was 49.0 square centimetres, an 18.6% increase, and substantial loss of shape had occurred, no significant further loss of shape occurred after ¾ hour at 160° F. but the toe cap became completely flat after 9 minutes at 220° F. (apart from a very small bump at the front of the toe cap about 0.1 cm. high), covering an area of 57.8 square cms. a 40% increase. The material however retained its grain leather like appearance and break and its fibrous flesh surface appearance. It is believed that this test indicates that even after substantial mulling and heat setting treatment, appreciable stresses are retained in the lasted upper material and these can be expected to result in loss of shape in the course of time due to wear on the foot or if the temperature is raised.

As might be expected the material unlike the toe cap in Example 2 did not regain its three dimensionally conformed shape on further heat treatment.

An advantage of the shoe upper component in accordance with tne present invention is that the fabric linings conventionally used in shoe production can be dispensed with or made lighter because they are no longer needed in order for the toe cap of the shoe to retain its shape. The toe cap linings or toe puffs in conventional shoes very substantially reduce the water vapour permeability of the toe cap and thus tend to reduce the comfort of the shoe on the foot in wear.

EXAMPLE 4

This describes the production of a men's casual shoe without laces of the same style as shown in FIG. 1. The shoe upper was formed in the same way as Example 1, but was made with carbon plack pigmented pastes and was finished to a grain leather-like appearance and break by spraying with dimethylformamide.

Figure 4:
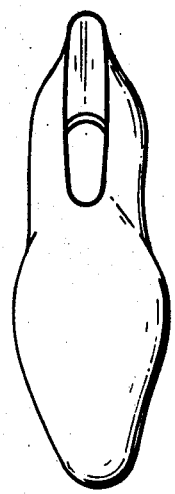
FIG. 4 is a part perspective plan view of an integral upper made as described in Example 4.

FIG. 4 is a plan view of the integral upper, showing its good shape, and partial insole portion 428.

Figure 5:
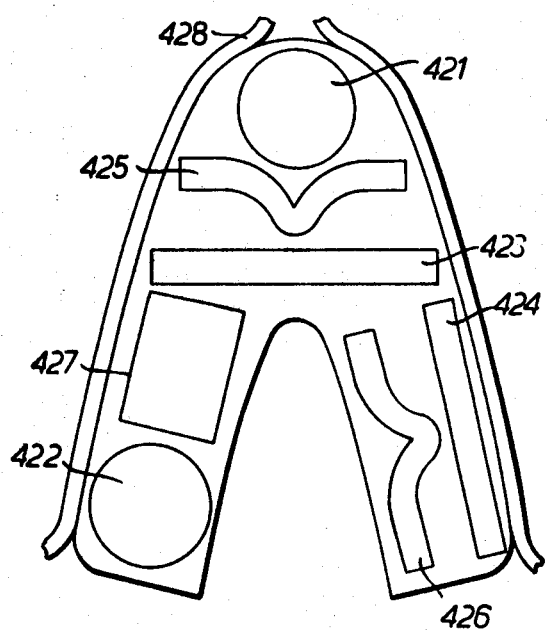
FIG. 5 is a view similar to FIG. 2 for an upper made as described in Example 4 for use with Table 2.

FIG. 5 shows the shoe upper cut down the back seam and layed flat and shows the areas from which samples were taken to enable the physical properties of the upper material to be measured. The turned under welt area 428 also had to be cut at the toe to enable the upper to be flattened out.

The samples bear corresponding reference numbers to Example 1 and the properties given below in Table 2 were measured by the same methods and are in the same units as for Example 1.

TABLE 2

| | Test | Sample Number | | | | | | |
| --- | --- | --- | --- | --- | --- | --- | --- | --- |
| | | 421 | 422 | 423 | 424 | 425 | 426 | 427 |
| Water vapour permeability | BSS 3177 | 1,390 / 45 | 2,260 / 75 | | | | | |
| Hydrostatic head | | 700 | 220 | | | | | |
| Pore size: | | | | | | | | |
|   Maximum | | 1.5 | 3.4 | | | | | |
|   Average | | 1.0 | 1.5 | | | | | |
| Ultimate tensile strength | | | | 8.0 | 9.3 | | | |
| Initial modulus (25%) | | | | 4.3 | 3.5 | | | |
| Extension at break | | | | 181 | 312 | | | |
| Notch tear | | | | | | 8.3 | 7.3 | |
| Satra flex life (0° C.) | | | | | | | | 0–18 |
| Weight/square metre | | | | | | | | 714 |
| Coating thickness: | | | | | | | | |
|   Spray coat | | | | | | | | 0.012 |
|   Top coat | | | | | | | | 0.32 |
|   Tie coat | | | | | | | | 0.89 |
| Substrate | | | | | | | | 1.07 |
| Average density (calculated) | | | | | | | | 0.30 |

EXAMPLE 5

This is a further example of an integral shoe upper as in Example 1. The upper was sampled and tested as in Example 1 and the physical properties obtained from samples taken from the same areas as shown in FIG. 2 and bearing corresponding reference numerals are given in Table 3 below.

TABLE 3

| | Test | Sample Number | | | | | | |
|---|---|---|---|---|---|---|---|---|
| | | 511 | 512 | 513 | 514 | 515 | 516 | 517 |
| Water vapour permeability | BSS 3177 | 2,240 / 70 | 1,675 / 55 | | | | | |
| Hydrostatic head | | 310 | 220 | | | | | |
| Pore size: | | | | | | | | |
| Maximum | | 2.8 | 3.8 | | | | | |
| Average | | 1.2 | 1.8 | | | | | |
| Ultimate tensile strength | | | | 13.8 | 15.5 | | | |
| Initial modulus (25%) | | | | 5.5 | 2.5 | | | |
| Extension at break | | | | 315 | 260 | | | |
| Notch tear | | | | | | 7.0 | 10.5 | |
| Satra flex life (0° C.) | | | | | | | | 6–24 |
| Weight/square metre | | | | | | | | 1,249 |
| Coating thickness: | | | | | | | | |
| Spray coat | | | | | | | | 0.01 |
| Top coat | | | | | | | | 0.81 |
| Tie coat | | | | | | | | 0.28 |
| Substrate | | | | | | | | 1.36 |
| Average density (calculated) | | | | | | | | 0.51 |

EXAMPLE 6

This is a further example of an integral shoe upper as in Example 1. The upper was sampled and tested as in Example 1 and the physical properties taken from the same areas as shown in FIG. 5 and bearing corresponding reference numerals are given in Table 4 below.

TABLE 4

| | Test | Sample Number | | | | | | |
|---|---|---|---|---|---|---|---|---|
| | | 621 | 622 | 623 | 624 | 625 | 626 | 627 |
| Water vapour permeability | BSS 3177 | 1,795 / 60 | 1,530 / 50 | | | | | |
| Hydrostatic head | | 700 | 140 | | | | | |
| Pore size: | | | | | | | | |
| Maximum | | 2.9 | 4.2 | | | | | |
| Average | | 1.3 | 1.2 | | | | | |
| Ultimate tensile strength | | | | 11.8 | | | | |
| Initial modulus (25%) | | | | 5.3 | | | | |
| Extension at break | | | | 267 | | | | |
| Notch tear | | | | | | 11.0 | 7.0 | |
| Satra flex life (0° C.) | | | | | | | | 0–18 |
| Weight/square metre | | | | | | | | 1,006 |
| Coating thickness: | | | | | | | | |
| Spray coat | | | | | | | | 0.007 |
| Top coat | | | | | | | | 0.75 |
| Tie coat | | | | | | | | 0.35 |
| Substrate | | | | | | | | 0.47 |
| Average density (calculated) | | | | | | | | 0.44 |

EXAMPLE 7

This describes the production of a ladies medium high heeled court shoe. The upper was formed of two unitary layers of microporous polyurethane which will be described as the substrate and top coat layers and the counter or heel area of the shoe was reinforced with an open mesh non-woven fabric laid on the mould before dipping and thus relatively free from strains. The open mesh pattern in the shoe was observed to be essentially free from distortions. The top coat surface was embossed and darkened across the toe cap and in a ½ inch deep band below the top line by use of the technique disclosed and claimed in commonly owned U.S. patent application Ser. No. 780,275, now abandoned, the disclosure of which is incorporated herein by reference. This consisted of laying a crumpled aluminium foil over the surface to be embossed and applying a heated surface onto the foil on the areas it wished to emboss. The temperatures used were near the softening temperature of the microporous polyurethane typically from 190° C. to 210° C. for short periods up to say 10 or 12 seconds with low pressures of up to say 5 to 10 p.s.i. A hand iron can conveniently be used.

The upper was fabricated into a court shoe in conventional manner by cementing a composition sole onto the underside of the integral upper and insole. A conventional metal base plate was placed inside the heel and the heel attached by screws passing through the base plate. An additional insole and ⅛ inch foam pad were then glued over the metal plate and inside the shoe.

Figure 6:
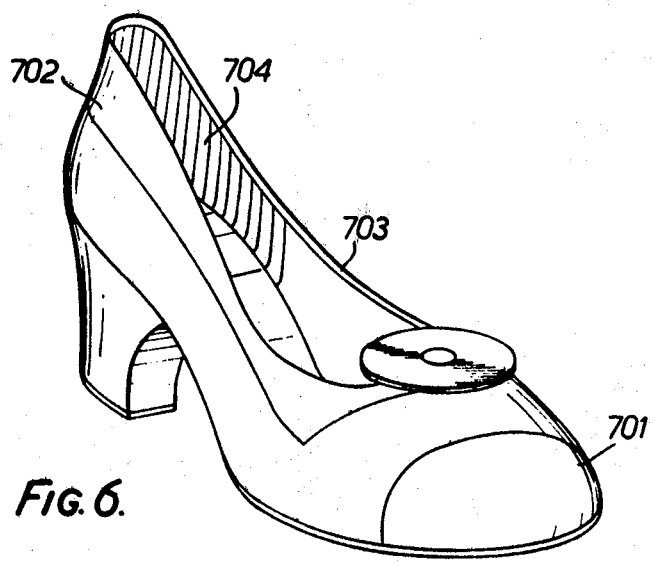
FIG. 6 is a perspective view of a ladies' court shoe made in accordance with Example 7.

FIG. 6 is a perspective view from in front and one side of this shoe.

The areas 701 and 702 are the embossed areas. 703 is a tape embedded in the top line of the upper and placed there during the dipping process. 704 is the reinforcing non-woven fabric also embedded integrally in the upper during the dipping process. The surface of the heel is smooth and free from the surface irregularities or "orange peel" apperance which is liable to occur on the heels of shoes made by lasting conventional man-made leather like materials which contain woven or needle punched non-woven reinforcing fabrics.

The heel also has a continuous surface free from a back seam.

The upper material was made using a substrate and top coat pastes similar to those used in Example 1.

The former was of a solid polypropylene in the shape of a last. To this were lightly attached the topline tape 703 and the fabric 704. The former was then dipped into the substrate paste in the same manner as in Example 1 except that a closed container was used and the former was left submerged in the closed container for five minutes before being withdrawn. This enables the surface of the paste to become smooth and helps achieve a smooth surface on the coating. The container was kept closed as much as possible to reduce moisture pick up by the paste. The dipped substrate paste covered former was drained of excess paste and immediately dipped in top coat paste diluted to 15% resin solids with dimethylformamide. The two coatings on the former were then immersed in water at 20° C. for a number of hours to coagulate the polymer to self supporting water vapour permeable form and remove the sodium chloride, the material was then dried on the former and the former removed from within the self suppoting three dimensionally conformed flexible shoe upper, which had an integral water vapour permeable insole 705 (not shown).

The shoe was then assembled as described above. The shoe had the following thicknesses; top left vamp area 2.7 mm., top right vamp area 3.1 mm., instep 2.0 mm., outstep 1.8 mm.

EXAMPLE 8

In this example a ladies' bootee was produced by the same technique as used in Example 7 except that no fabric reinforcement was used and a zipper was embedded in the back of the heel facing outwardly during the dipping operation. The upper material was slit along the line of the zipper after the process was completed and the zipper was found to operate effectively. The topline was finished with suede leather-like inserts glued onto consolidated areas extending down from the top line and a folded over suede leather-like flap was attached to the top of the vamp and folded down over the vamp.

The shoe upper had the following thicknesses top left top line vamp area 2.0 to 2.5 mm., top right top line vamp area 2.5 to 2.8 mm., instep 1.8 to 2.0 mm., and outstep 1.5 to 1.8 mm.

A drop of water placed on the vamp remained incompletely absorbed for over 1 hour. When the drop was then removed only the area immediately under the drop was darker in colour indicating that the small amount of penetration which had occurred was confined to a localized area.

EXAMPLE 9

This describes the production of a men's casual shoe without laces similar to that illustrated in FIG. 1. The shoe upper was formed of a single thick layer of microporous polyurethane.

The polymer used was a polyurethane made in solution in dimethylformamide from a polyester by reaction with a diol and a diisocyanate under an inert atmosphere.

The reaction was carried out in pure N,N'-dimethylformamide (380 kgs.) using 130 kgs. of an anhydrous adipic acid/ethylene glycol/butane 1:4 diol copolyester having a molecular weight of about 2000, and a hydroxyl number of 52.8, solid under the trademark Desmophen 2001 (by Bayer) and 28.38 kg. of anhydrous butane 1:4 diol. 108.8 kgs. of pure 4,4'-diphenylmethane diisocyanate was then added and the mixture cooled so as to keep the temperature below 50° C. When the reaction was substantially complete additional butane 1:4 diol was added to react with the remaining free isocyanate groups and the temperature held at about 50° C. until the viscosity was about 2300 poise at 24° C. This additional diol was 3.4 kgs. Finally 5 kgs. of a 1:1 methanol/N,N'-dimethylformamide blend was added to react with any traces of free isocyanate still present. The viscosity at this stage of a sample at 24° C. was 2700 poise.

The viscosity of the complete solution at 24° C. the next day was 2100 poise the solids content was 31.5%, the intrinsic viscosity was 1.075 and the Huggin's slope constant K of the viscosity number plot was 0.37.

A sample of the solution was then diluted to 15% resin solids and cast in a flat glass reservoir. The solvent was evaporated off slowly over several hours and finally more rapidly under vacuum at 50° C. to give a substantially solvent free transparent film 0.2 mm. thick.

The ultimate tensile strength was 789 kg. per square cm. measured by the method described in British standard specification No. 3144/1968.

The notch tear strength was 161 kg. measured by the method described above in Example 1.

Figure 9.1 is a stress strain curve for this polymer film using a dumb-bell shaped sample as for ultimate tensile strength. The curve was arrived at by combining the load time graph from an Instron tensile testing machine on which the sample was extended at a constant rate of 50% per minute with an extension time graph plotted by hand using reference "bench marks" drawn on the sample to give the true strain. Both sets of measurements were done at room temperature.

Figure 7:
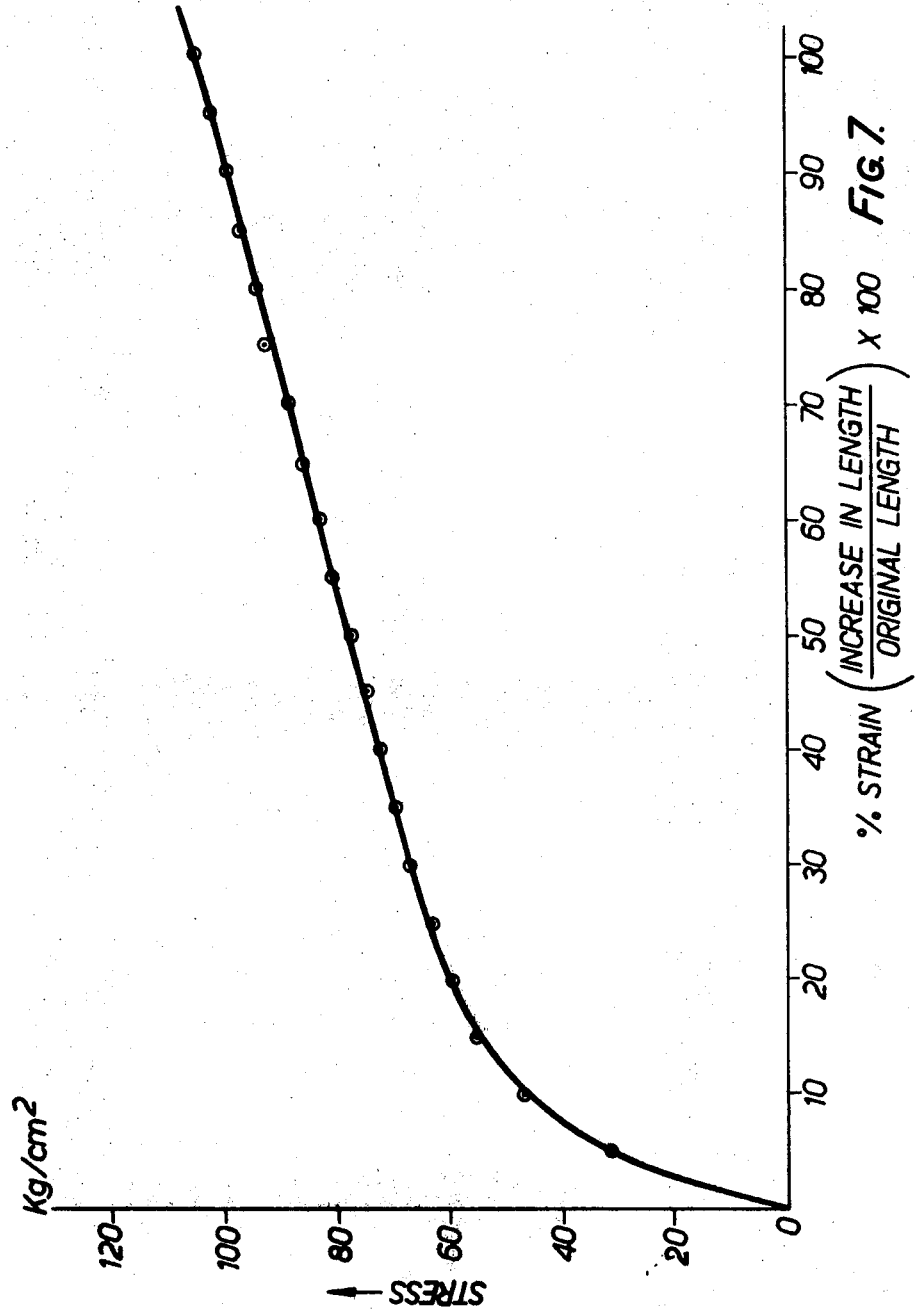
FIG. 7 is a stress strain curve for the polymer used in Example 9 showing in detail the curve up to 100% extension.

It can be seen from FIG. 7 that the initial modulus at 25% extension is 64 kgs. per square cm.

Figure 8:
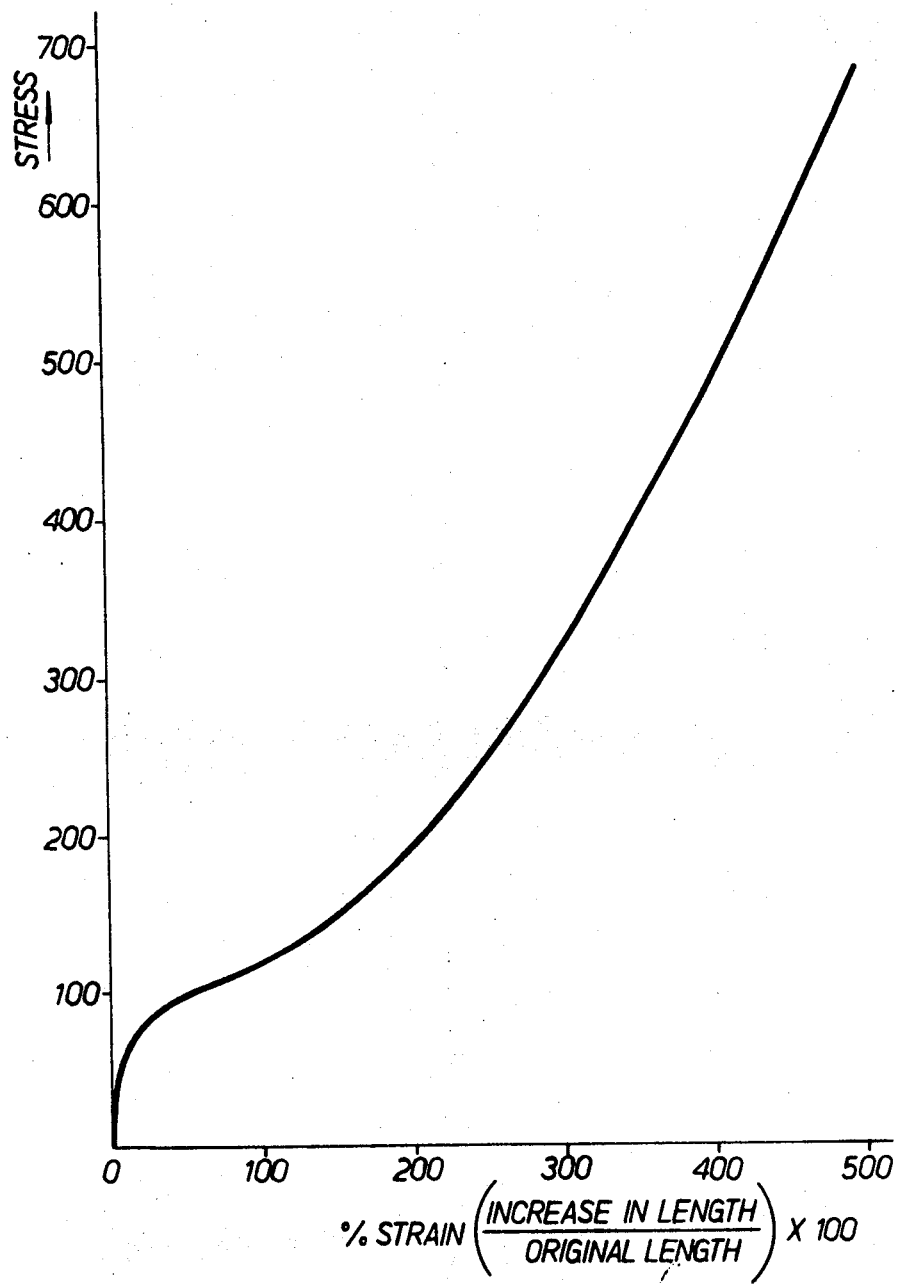

FIG. 8 is the same experiment repeated at 60% per minute rate of extension using a sample 5 cm. x 1.2 cm. by 0.4 mm.

A stabilized polymer paste containing evenly dispersed microscopic salt particles was made from the polymer solution described above. The paste contained 28% resin solids 2 parts of sodium chloride, of similar particle size to that used in Example 1, for each part of resin 0.3% of carbon black pigment based on resin, 1.5% based on resin of Staboxol a carbodiimide stabilizer against hydrolysis of the polyurethane, 2.0% based on resin of Cyasors U.V. 24 namely 2,2'-dihydroxy-4-methoxybenzophenone, a stabilizer against ultraviolet ray degradation of the polyurethane and 0.5% based on resin of Irganox 1010 namely tetrakis [methylene3-(3',5',ditertiary-butyl-4'-hydroxyphenyl propionate] methane, an antioxidant for the polyurethane.

The paste was mixed on a water cooled triple roll mill using high shear conditions until an even dispersion of the salt in the polymer solution was obtained. The paste was then thoroughly deaired under vacuum and stored in sealed cans.

A Vyon mould similar to that described in Example 1 was lowered into a reservoir of the deaired paste and kept there for 1 minute. It was then removed so that the toe just emerged, then the heel was brought up to near the level of the surface of the paste so that the toe re-entered the paste, then the heel was brought just clear of the paste so that the toe re-entered the paste, and then the toe was brought clear of the paste so that the heel was the last portion to leave the paste. A stream of air heated to 40 to 100° C. was then blown over the paste on the former to set the surface.

2 minutes after leaving the paste the former with the coating was immersed in water at 31° C. and left in the static water bath for 2 hours to coagulate the polymer to self supporting flexible vapour permeable form, the dimethyl formamide diffusing out into the water bath due to its great affinity for water and the water permeating the polymer layer and beginning to dissolve that salt. Thus during this step the dimethyl formamide and salt concentration in the water bath is gradually rising.

Blends solvent and non-solvent can be used instead of pure non-solvent for this step. Also electrolyte solutions for example saturated salt solutions can be used instead of pure non-solvent or in addition to the solvent non-solvent blends. These variations can be useful in cntrolling the rate of coagulation of the polymer.

The coating was then slipped off the Vyon former and leached with cold water for 2 hours to remove substantially all the dimethyl formamide and sodium chloride.

The upper was then assembled in the same manner as in Example 1 into a shoe. The upper could of course be assembled into a shoe by many other techniques and indeed the whole of the upper need not necessarily be used, the counter areas could be discarded and the shape retaining vamp and toe area only used in conjunction with quarters of natural leather, other man-made leather-like materials, vacuum or pressure moulded quarters or injection moulded quarters.

It will be appreciated that the advantages of enhanced shape retention are possessed not only by integral uppers made in accordance with the present invention but also by toe and vamp areas or quarters or complete heel and quarter areas made separately.

Such pre-shaped shape retaining components would considerably reduce shoe manufacturers costs in obviating the need for mulling, pulling over, lasting and heat setting operations in the manufacture of shoes.

The shoe upper in this example was removed from the shoe and cut up as indicated in FIG. 9 to enable the physical properties of the material of which the upper was composed to be measured.

The samples bear corresponding reference numbers to Example 1 and the properties given below in Table 5a were measured by the same methods and are in the same units as for Example 1.

EXAMPLE 10

This was identical to Example 9 except that the time between removing the former from the paste and immersing it in the water bath was one minute. This resulted in a slightly thicker and stronger coating.

The shoe upper was again cut up as indicated in FIG. 1. The test results were obtained as in Example 9 and are given in Table 5b below.

It had the following physical properties measured as in Example 1: water vapour permeability 4750; hydrostatic head 80; pore size (maximum) 14.4 (average) 6.9; ultimate tensile strength L 10.8 x 12.2; initial modulus (25%) L 2.5 x 2.6; extension at break L 440 x 463; notch tear L 5.5 x 4.5; Satra flexlife (0° C.) greater than 100 hours; weight 780; thickness 1.75 to 1.79 average density (calculated) 0.45–0.44.

A separate piece was given a black Earnshaw finish as described in Example 1 and made up into a shoe as follows. The shoe upper components were cut from the sheet material, the edges skived, and the components fitted and stitched.

The uppers were then pulled over the last with the

TABLE 5a

| | Test | Sample Number | | | |
|---|---|---|---|---|---|
| | | 921 | 922 | 923–924 | 925–926 | 927 |
| Water vapour permeability | BSS 3177 | 4,680 | | | | |
| Hydrostatic head | | | 100 | | | |
| Pore size: | | | | | | |
| Maximum | | | 10.3 | | | |
| Average | | | 5.1 | | | |
| Ultimate tensile strength | | | | 7.5 | | |
| Initial modulus (25%) | | | | 2.4 | | |
| Extension at break | | | | 430 | | |
| Notch tear | | | | | 2.6 | |
| Satra flex life (0° C.) | | | | | | 18–34 |
| Weight | | | | | | 510 |
| Thickness | | | | | | 0.92–1.40 |
| Average density (calculated) | | | | | | 0.56–0.36 |

TABLE 5b

| | Test | Sample Number | | | | |
|---|---|---|---|---|---|---|
| | | 1,011 | 1,012a | 1,012b | 1,013–1,014 | 1,015–1,016 | 1,017 |
| Water vapour permeability | BSS 3177 | 4,500 | | | | | |
| Hydrostatic head | | | 80 | | | | |
| Pore size: | | | | | | | |
| Maximum | | | | 12.0 | | | |
| Average | | | | 7.2 | | | |
| Ultimate tensile strength | | | | | 7.6 | | |
| Initial modulus (25%) | | | | | 2.9 | | |
| Extension at break | | | | | 370 | | |
| Notch tear | | | | | | 2.7 | |
| Satra flex life (0° C.) | | | | | | | 0–6 |
| Weight | | | | | | | 551 |
| Thickness | | | | | | | 1.0–2.0 |
| Average density (calculated) | | | | | | | 0.55–0.33 |

In both Examples 9 and 10 optional surface finishes could have been given as described in Example 1. These would have the effect of tending to reduce the water vapour permeability by up to 10% or so.

EXAMPLE 11

This describes the production of a mens' shoe from a single layer of microporous polyurethane with a black Earnshaw finish as in Example 1.

The polymer and paste formulation used were identical to that used in Examples 9 and 10. The desired paste was knife spread onto the smoother surface of a Vyon sheet as described in Example 1 which had been thoroughly soaked in dimethyl formamide. The knife gap used was 0.135 inch (3.4 mm.). The layer was immersed upside down in water at 30° C. with the Vyon support bowed around its longitudinal axis, the spreading direction of the paste layer, so that the polymer was coagulated whilst spread on the outside of a convex surface. This tends to produce a more even surface in the coagulated polymer. After 1½ hours the self supporting microporous polymer layer was stripped from the Vyon backer and immersed for two hours in water at 60° C. The layer was then dried for 1 hour at 95° C.

minimum amount of tension needed to fit the material to the shape of the last, cement side toe and was lasted, and heel seat tack lasted onto the insole. After lasting the shoes were sheat set passing through a two zone apparatus in 4 minutes having a moist heat zone set at 72° C. and a dry heat zone set at 130° C. The tacks were then removed. The large pleats on the turned in portion were then sanded away the top finish surface of the lasted margin of the upper was then abraded off with the paper side of emery paper, and a paper scrim attached with latex over the insole. An injection moulding adhesive, a polyurethane cement, was then applied and allowed to dry, a heel filler block of compressed cardboard was attached and a polyvinyl chloride sole was then injection moulded into position.

In order to test the shape retention of this material after lasting the tests carried out in Examples 2 and 3 were repeated with the following results.

In order to provide a comparison between the shape retaining article of the invention and a lasted three dimensionally conformed article the complete toe cap of the shoe made in Example 9 and the complete toe cap of the lasted shoe of Example 11 were cut from the shoes. The toe caps included the turn in portion in each case but were stripped from any adhered fabric lining. FIGS.

10, 11 and 12 are side elevations plan views and views along the line A in FIG. 11 respectively for the toe cap of Example 9. The full line shows the shape at rest at room temperature after being cut from the shoe and the dotted line shows the shape after heating to 95° C. for 15 minutes. It will be noted that the turn in portion 971 has in fact tended to recover to a flatter position, its original position in the shoe, from the opened out position to which it was distorted whilst being cut from the shoe.

FIGS. 14 15 and 16 are views corresponding exactly to FIGS. 10, 11 and 12 and show the result of heating the lasted toe cap of Example 11 to 95° C. for 15 minutes. Substantial loss of shape has occurred but in this case, instead of shape being regained it has been lost, the toe cap has curled up. It will be observed that the turn in 1131 has tended to try to return to the same plane as the rest of the sheet material and it is thought that it is the effect of this tendency at the front of the toe which has probably caused the flattening of the sides of the toe cap but exaggerated the bending around the median line of the vamp, i.e. around the direction of arrow A.

EXAMPLES 12, 13 AND 14

These are examples of the production of a mens' shoe without laces similar to that illustrated in FIG. 1.

As in Example 9 the upper is formed of a single thick layer of mircoporous polyurethane with an integral turned under insole portion for attachment to the sole.

The polymer used in these examples is thought to be similar to the polyester based polyurethane described in Example 1 except that instead of a polyester a polycaprolactone is thought to be reacted with a diisocyanate, which is thought to be 4,4'-diphenylmethane diisocyanate, and a glycol, which is thought to be butane-1,4-diol.

The material used is that sold in Great Britian by Elastollan Limited as Elastollan TN 65 CH 98 AK.

When compression moulded to produce a non-porous material such as a film or sheet this polymer has the following properties. As is known during such compression further polymerization occurs similar to the polymerization which occurs when the material is dissolved in a solvent such as dimethylformamide probably due at least in part to further reaction occurring between previously unreacted hydroxyl and isocyanate groups which are present in the elastomeric material.

The material when moulded as above has the following typical values of the various physical properties quoted:

Density 1.20 grams per cc. (DIN 53500); Shore D 51–52 (DIN 53505); Ultimate tensile strength 550–600 kgs. per cm.$^2$ (DIN 53504); extension at break 500% to 700% (DIN 53504); tear strength (Graves) 120 to 130 kgs. per cm. (DIN 53515); abrasion loss 50 mm.$^3$ (DIN 53516); compression set (70° C.) 35% to 45% (DIN 53517); and initial modulus at 5% extension 50 to 60 kgs. per cm.$^2$ (B.S.S. 903:1963 part A2).

3.6 kg. of the solid polymer were mixed with 8.4 kg. of dimethylformamide at an initial temperature of 13° C. using a high speed high shear Silverson mixer after 45 minutes the polymer had dissolved and the temperature of the mixture had risen to 52° C. At this point 18 grams of methanol were added to terminate the reaction. The solution had an apparent viscosity of about 100,000 centipose measured on a Brookfield viscometer. The polymer in solution had an intrinsic viscosity of 0.74 and the solution had a solids content of 30%.

This solution was then made up into a paste having a viscosity of about 65,000 centipose as in Example 9 and the procedure of Examples 9, 10 and 11 followed to produce two dipped shoes, Examples 12 and 13, and a sheet material which was used to produce a lasted shoe, Example 14.

TABLE 6

| Example | 12 | 13 | 14 |
|---|---|---|---|
| Water vapour perm. BSS 3177 | 3,965 | 3,505 | 3,850 |
| Hydrostatic head | 170 | 140 | 145 |
| Pore size: | | | |
| Maximum | 8.0 | 7.2 | 9.0 |
| Average | 5.6 | 5.1 | 6.0 |
| Ultimate tensile strength | 9.9 | 11.5 | L 9.3×10.5 |
| Initial modulus (25%) | 2.6 | 3.6 | L 2.0×2.0 |
| Extension at break | 505 | 385 | L 407×424 |
| Notch tear | 3.6 | 3.9 | L 4.0×3.8 |
| Satra flex life (0° C.) | 24–33 | | |
| Weight | 560 | 880 | 650 |
| Thickness | 1.25–2.00 | 1.60–3.10 | 1.55–1.56 |
| Average density (calculated) | 0.45–0.28 | 0.55–0.28 | 0.42 |

EXAMPLE 15

This describes the production of an integral one layer men's laceless shoe upper similar to that of Example 1 but having an integral insole and an integral preshaped fabric reinforcement.

A former similar to that used in Example 1 had two layers of a tubular knitted cotton bandage drawn over it so that the layers accurately conformed to the surface of the former.

The bandage was that sold as Tubegauze No. 56 by Scholl Manufacturing Co.

The polymer was formed by polymerization in solution in the same manner as that described in Example 9. The polymer had an intrinsic viscosity of 0.09 and when made up into a 30% solids content solution in N,N'-dimethyl-formamide had an apparent viscosity of 14,000 centipoise as measured on a Brookfield viscometer at 25° C. in accordance with the manufacturers instructions. This solution was mixed and milled with finely divided sodium chloride as described in Example 1 so as to produce a salt to polymer ratio of 2:1 and 4% based on the total paste of brown pigment was also mixed and milled into the paste until it was an even dispersion of salt and pigment. The paste had a viscosity of 52,000 centipose measured as above. The former with the fabric in position was immersed in the paste for 30 seconds and then withdrawn at a rate of 2 to 3 inches per minute in the manner described in Example 9. This method gave an improved evenness to the coating particularly at the lower edges of the former.

The coating on the former was then immersed immediately in water at 20° C. for 24 hours to coagulate the polymer to microporous form and remove the solvent and salt. The coating was then cut down the back seam and peeled from the former with the integral fabric reinforcement whilst it was still wet. On drying only very slight curling of the cut back seam occurred indicating that the system did not contain appreciable stresses.

The fabric used was one which could be easily stretched but after impregnation the weave was locked in position giving good shape retention and strength to the shoe upper. In addition the thickness of the polymer layer was even over substantially the whole of the coating.

The excellent shape retention of the material was demonstrated by the results of heating the toe cap (1520, see FIG. 17) cut out from the upper in the same manner as in Examples 2 and 3. Prior to heating the area beneath the toe cap was 23.6 square cms. No detectable change in area occurred even when the toe cap was heated to 220° F. for 2¾ hours. After 9 hours of moderate flattening pressure the area beneath the toe cap was 25 square cms. After 1½ hours at 250° F. the toe cap had recovered completely to its original shape.

The shoe upper was then cut up as indicated in FIG. 17. The samples bear corresponding reference numerals to Example 1 and the properties given below in Table 6 were measured by the same methods and are in the same units as for Example 1.

The thickness was measured at eight different positions indicated on FIG. 17 by the numerals 1521 to 1528 inclusive. The results are given in Table 6.

TABLE 6

| Sample Number | 1511 | 1512a | 1512b | 1513 | 1514a | 1514b | 1515 1516 | 1517 |
|---|---|---|---|---|---|---|---|---|
| Water vapour permeability BSS 3177 | 4100–130 | | | | | | | |
| Hydrostatic head | | | | 30–40 | | | | |
| Pore size: | | | | | | | | |
| Maximum | | 17.9 | | | | | | |
| Average | | 8.0 | | | | | | |
| Ultimate tensile strength | | | | 5.5 | 5.3 | 5.6 | | |
| Initial modulus (25%) | | | | | 3.6 | 4.8 | | |
| Extension at break | | | | | 45 | 30 | | |
| Notch tear | | | | | | | 3.6 | |
| Satra flex lief (0° C.) | | | | | | | | |
| Weight (Sample 20 cm.²) | | | | | | | | 680 |

| Sample number | 1521 | 1522 | 1523 | 1524 | 1525 | 1526 | 1527 | 1528 |
|---|---|---|---|---|---|---|---|---|
| Thickness | 1.70 | 1.50 | 18.7 | 1.55 | 1.54 | 1.61 | 1.60 | 1.75 |

NOTE.—Average density (calculated) 0.45–0.36.

EXAMPLE 16

For comparison purposes a man's shoe made from Corfam (trademark, E. I. du Pont de Nemours) man-made leather-like material and sold under the mark TUF by G. Britten & Sons Limited was tested in the same way as the shoes made in Examples 9 and 11. It is believed that this man-made leather-like material incorporates a fabric reinforced porous substrate comprising a polyester fibre felt made by needle punching a batt of staple fibres and then shrinking the batt to consolidate it followed by impregnating it with a polyether polyurethane solution in dimethylformamide and coagulating the polymer in the felt by washing it with water, as disclosed in British Pat. No. 914,713. The material is also believed to have one or more microporous polyether polyurethane coatings made by coagulating polyurethane dispersions or gels with water for example as disclosed in British Pat. No. 1,002,225.

The toe cap was removed from the shoe and tested in the same way as in Example 11 and FIGS. 18, 19 and 20 correspond to FIGS. 14, 15 and 16. It will be observed that the same type of distortion has occurred as in Example 11 with the turn in 1611 trying to flatten out indicating that the shoe upper is not resistant to loss of shape on heating to 95° C. for 15 minutes.

Reference has been made to the shell-like three dimensional articles in accordance with the present invention being flexible and self-supporting. The articles are flexible in the sense that they can be bent by hand for example through 90° or more and on release spring back to their unbent shape. The articles are self-supporting in the sense that when rested on a flat surface or suspended in the air they do not significantly lose their shape under their own weight.

It will be appreciated that in addition to the finishing techniques described in Example 1 additional conventional leather finishing techniques, which enhance resistance to penetration by liquid water whilst retaining an adequate degree of water vapour permeability, such as the application of waxes and polishes, and water repellants such as silicones, can also be used.

Electron photomicrographs have indicated that the actual porous structure of the materials made in accordance with the examples comprises irregular though generally compact cavities or voids bounded at least partially by thin diaphragms through which small holes interconnect the voids one with another. The voids have maximum dimensions in the range of up to about 45 microns and the smaller holes may have maximum dimensions apparently as low as ½ micron. The walls of the cavities may be of the order of 1 to 10 microns thick. Fine cavities may also be present in these walls.

The materials made as described herein have very good "drape" and flexibility and leatherlike soft supple tactile properties. It will be appreciated that the initial modulus values which range for about 1 to about 6 reflect this. Materials with higher initial modulus values tend to be less flexible.

EXAMPLE 17

This is an example embodying the invention disclosed in commonly owned and copending U.S. patent application Ser. No. 820,922 the disclosure of which as mentioned above is incorporated herein by reference.

This example describes the production of a pair of integral shoe uppers with an integral insole, the upper having been dyed during its formation by the method in accordance with the invention disclosed in the above specification. The upper was attached as by stitching or welding or gluing to a leather or plastic or rubber outsole having been given a surface finish as described in connection with Example 1.

The polymer used was a 25% polyvinyl chloride 75% polyurethane blend dissolved in dimethylformamide. The resin concentration was 28%. The solution had two parts of finely divided sodium chloride per part of resin dispersed as by milling through it. The salt had the same order of particle size as that used in Example 1.

The polyurethane used was the same as that used in Example 9 and the solution contained the same stabilizers in the same amounts.

A hollow Vyon mould in the shape of a shoe last provided with vent tubes as described in Example 1 was dipped into the paste and after 1 minute removed therefrom in the manner described in Example 9 of this specification. A stream of air heated to 40° C. to 100° C. was then blown over the paste to set the surface. Two minutes after leaving the paste the former with the coating on it was immersed in a dye bath at 20° C. for 18 hours then washed with water, stripped from the former and dried to produce an evenly dyed brown shoe upper. The dye bath was prepared by adding a 50% solution of Irgacet Brown 6RL dye powder (made, it is believed, in accordance with U.S. Pat. No. 2,551,056) in methanol to water so as to produce a 0.5% dyestuff solution.

One of the shoe uppers was retained without finishing and was cut up in the manner described in Example 9 to enable its physical properties to be measured.

The material had a thickness ranging from 1.01 to 1.73 mm. and the dyed layer at the outer surface was 0.08 to 0.12 mm. thick. The weight of the material was 490 grams per square metre.

Two measurements were made of ultimate tensile strength, initial modulus and elongation at break; one on a sample 1.18 mm. thick gave values of 3.7 kgs./cm., 2.1 kgs./cm. and 120% respectively; the other on a sample 1.57 mm. thick gave values of 7.4 kgs./cm., 2.3 kgs./cm. and 173% respectively. In a single determination the maximum poresize was determined as 5.5 microns, the average pore size as 3.3 microns, and the hydrostatic head as 280 mm. of mercury.

The notch tear strength was measured across the toe using a sample 1.18 mm. thick as 2.0 kgs. and along the side or quarter of the upper using a sample 0.98 mm. thick as 1.7 kgs. The material also had a water vapour permeability of 2750 grams/square metre/24 hours. These measurements were made by the methods described in Example 9 and Example 1. The material also had a resistance to penetration by liquid water using a Bally penetrometer of 15 cycles. The method used was in accordance with British standard specification No. 3144/1968.

The method consisted of forming a trough shaped container of the material under test about 75 mm. long and flexing it by pushing its ends towards and away from each other using a 3 mm. stroke 50 times per minute. The material was arranged with what is intended to be its outer surface in use as the outside surface of the trough and was placed in a distilled water bath and flexed therein. Penetration of water through the material was detected electrically by suitable electrode arrangements.

What we claim as our invention and desired to secure by Letters Patent is:

1. A shoe upper component comprising microporous polyurethane sheet material 0.5 to 5 mm. thick which is water vapour permeable, self supporting, flexible and substantially resistant to loss of shape so that when heated in an unsupported state at 200° F. to 240° F. for approximately ¼ hour it substantially retains its original three dimensionally conformed shape.

2. A shoe upper component as claimed in claim 1 provided with an integral insole portion providing the complete insole.

3. A method of making a shoe upper component comprising microporous polymer sheet material 0.5 to 5 mm. thick which is water vapour permeable, self supporting, flexible and substantially resistant to loss of shape so that when heated in an unsupported state of 200° F. to 240° F. for approximately ¼ hour it substantially retains its original three dimensionally conformed shape, the method comprising, forming a mixture of paste-like consistency comprising polymer extended with a liquid vehicle, dipping a former in the desired shape into the mixture so that a thick coating of the mixture is formed on the surface of the former and coagulating the polymer into self supporting flexible form with non-solvent for the polymer.

4. A method as claimed in claim 3 in which the mixture has evenly distributed through it microscopic particles of removable filled and comprises a solution of polymer in at least one solvent and the non-solvent is in liquid form, and the filler is substantially removed from the coagulated polymer.

5. A method as claimed in claim 3 in which the former is hollow and porous and is provided with venting means to enable air to escape from within it and liquid to be introduced into its interior.

6. A method as claimed in claim 3 in which the mixture prior to being shaped has a viscosity of at least 50,000 centipoise measured on a Brookfiield viscometer.

7. A method as claimed in claim 3 in which the article has a thickness in the range 0.030 inch (0.76 mm.) to 0.090 inch (2.3 mm.) and is made in a single step.

References Cited

UNITED STATES PATENTS

| | | | |
|---|---|---|---|
| 3,116,501 | 1/1964 | Markeritch | 36—9X |
| 3,180,853 | 4/1965 | Peters | 36—45X |
| 3,264,761 | 8/1966 | Johnson | 36—9X |
| 3,426,454 | 2/1969 | Mitchell et al. | 36—2.5 |

PATRICK D. LAWSON, Primary Examiner

U.S. Cl. X.R.

12—146C